(12) United States Patent
Parsons et al.

(10) Patent No.: US 12,030,624 B2
(45) Date of Patent: Jul. 9, 2024

(54) ELECTRICAL CONDUCTOR SYSTEM FOR A ROTOR BLADE AND METHOD OF MANUFACTURING THE ELECTRICAL CONDUCTOR SYSTEM

(71) Applicant: Lockheed Martin Corporation, Bethesda, MD (US)

(72) Inventors: Eric S. Parsons, Middlebury, CT (US); Christopher Michael Colschen, Hamden, CT (US); Claude George Matalanis, Monroe, CT (US); Benjamin Edward Isabella, Hamden, CT (US); Marc A. Antonetz, Orange, CT (US); Timothy James Conti, Shelton, CT (US); Frank M. Caputo, Cheshire, CT (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 127 days.

(21) Appl. No.: 17/485,192

(22) Filed: Sep. 24, 2021

(65) Prior Publication Data
US 2023/0098029 A1 Mar. 30, 2023

(51) Int. Cl.
| | |
|---|---|
| *B64C 27/473* | (2006.01) |
| *H02B 1/20* | (2006.01) |
| *H02B 1/26* | (2006.01) |
| *H02B 1/30* | (2006.01) |
| *H02G 15/007* | (2006.01) |
| *H02G 15/06* | (2006.01) |
| *H02G 15/18* | (2006.01) |

(52) U.S. Cl.
CPC .......... *B64C 27/473* (2013.01); *H02B 1/202* (2013.01); *H02B 1/26* (2013.01); *H02B 1/305* (2013.01); *H02G 15/007* (2013.01); *H02G 15/06* (2013.01); *H02G 15/1833* (2013.01)

(58) Field of Classification Search
CPC . H01B 1/202; H01B 1/26; H01B 7/04; H01B 7/041; H01B 7/043; H01B 7/08; H01B 7/0823; H01B 7/0838; H01B 7/0846; H01B 7/0884; B64C 27/473; H01R 13/46
USPC ...... 174/110 R, 113 R, 117 R, 117 F, 117 FF
See application file for complete search history.

(56) References Cited

U.S. PATENT DOCUMENTS

| | | | |
|---|---|---|---|
| 7,391,622 B2 | 6/2008 | Marshall et al. | |
| 7,740,452 B2 * | 6/2010 | Mueller | H01B 7/065 416/241 A |

(Continued)

FOREIGN PATENT DOCUMENTS

FR 0551787 A1 * 11/1992 ............ D02G 3/38

*Primary Examiner* — William H. Mayo, III
(74) *Attorney, Agent, or Firm* — Foley & Lardner LLP

(57) ABSTRACT

An electrical conductor assembly for a rotor blade includes a substrate and at least one electrical conductor. The substrate includes an inboard end portion and an outboard end portion. The at least one electrical conductor is attached to the substrate and extends between the inboard end portion and the outboard end portion. The at least one electrical conductor is configured to transmit electricity along a length of the rotor blade. The inboard end portion and the outboard end portion are structured such that when the electrical conductor assembly is installed within the rotor blade, the inboard end portion is securable relative to the rotor blade and the outboard end portion is movable relative to the rotor blade.

16 Claims, 25 Drawing Sheets

(56) References Cited

U.S. PATENT DOCUMENTS

| | | |
|---|---|---|
| 9,139,297 B1 | 9/2015 | White |
| 10,822,076 B2 | 11/2020 | Hunter et al. |
| 2004/0166408 A1 | 8/2004 | Anderson et al. |
| 2006/0049302 A1* | 3/2006 | Kennedy .............. B64C 27/615 244/17.11 |
| 2014/0024251 A1* | 1/2014 | Gaffiero ................ H01R 13/46 439/527 |
| 2020/0247561 A1 | 8/2020 | Rivera |

\* cited by examiner

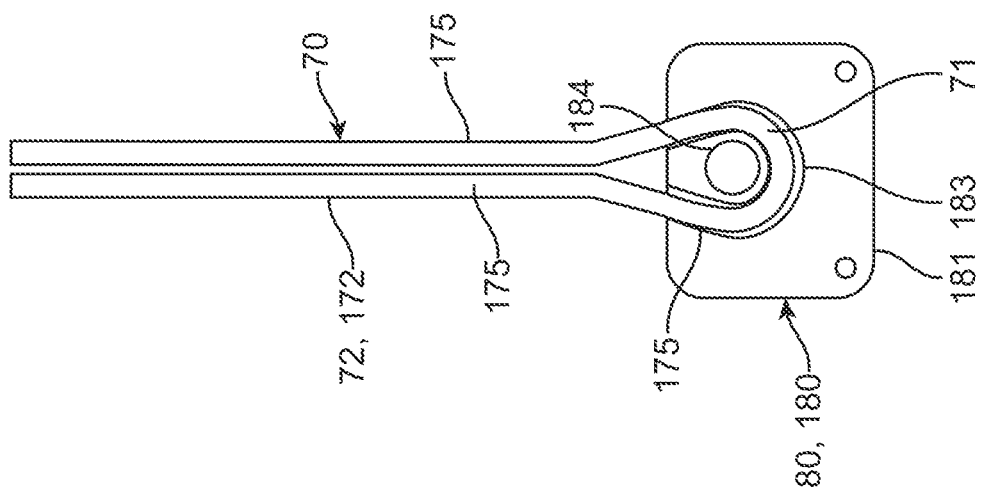
FIG. 8C
FIG. 8B
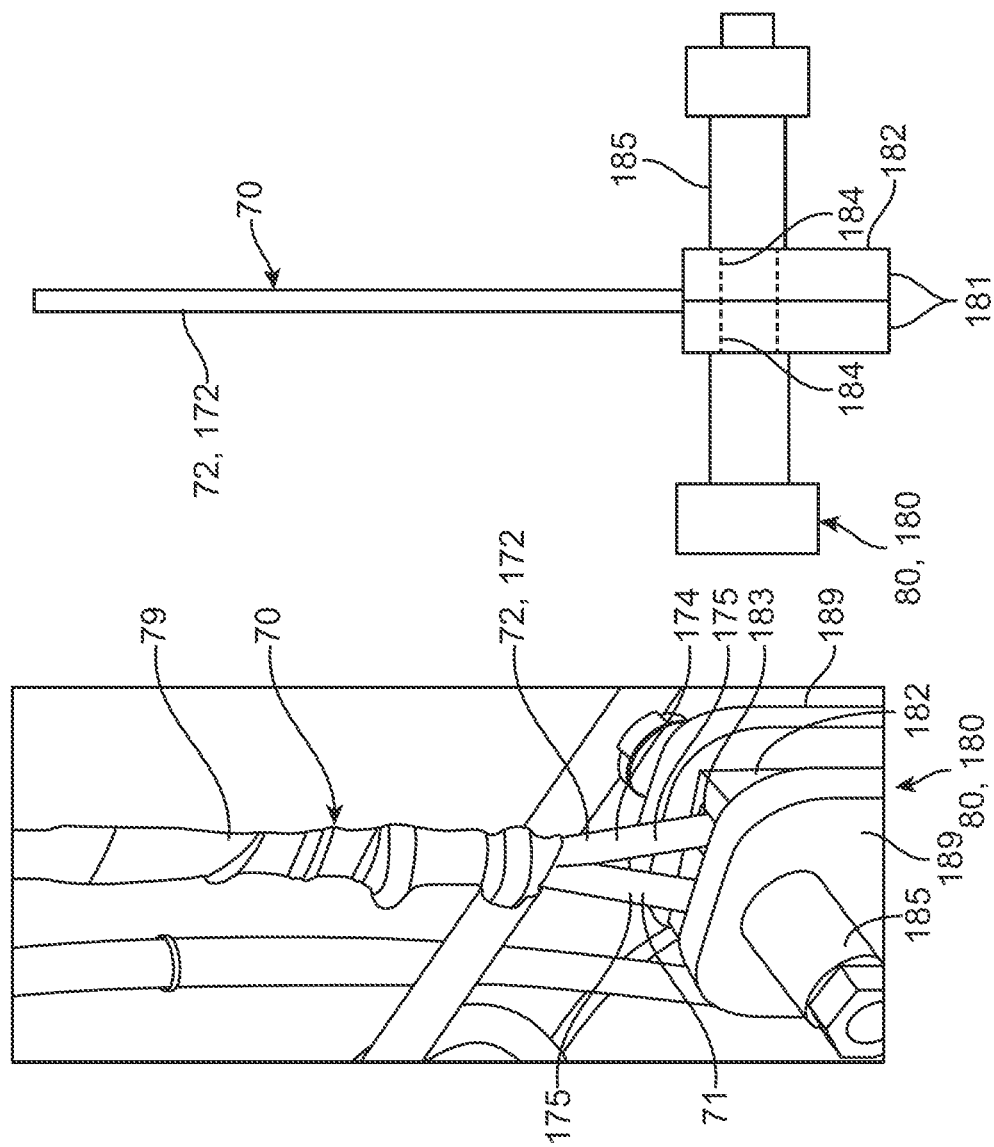
FIG. 8A

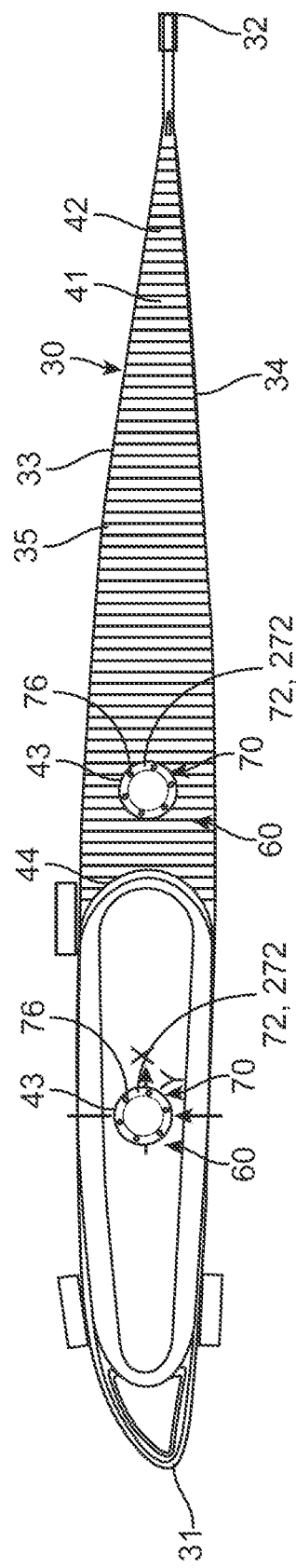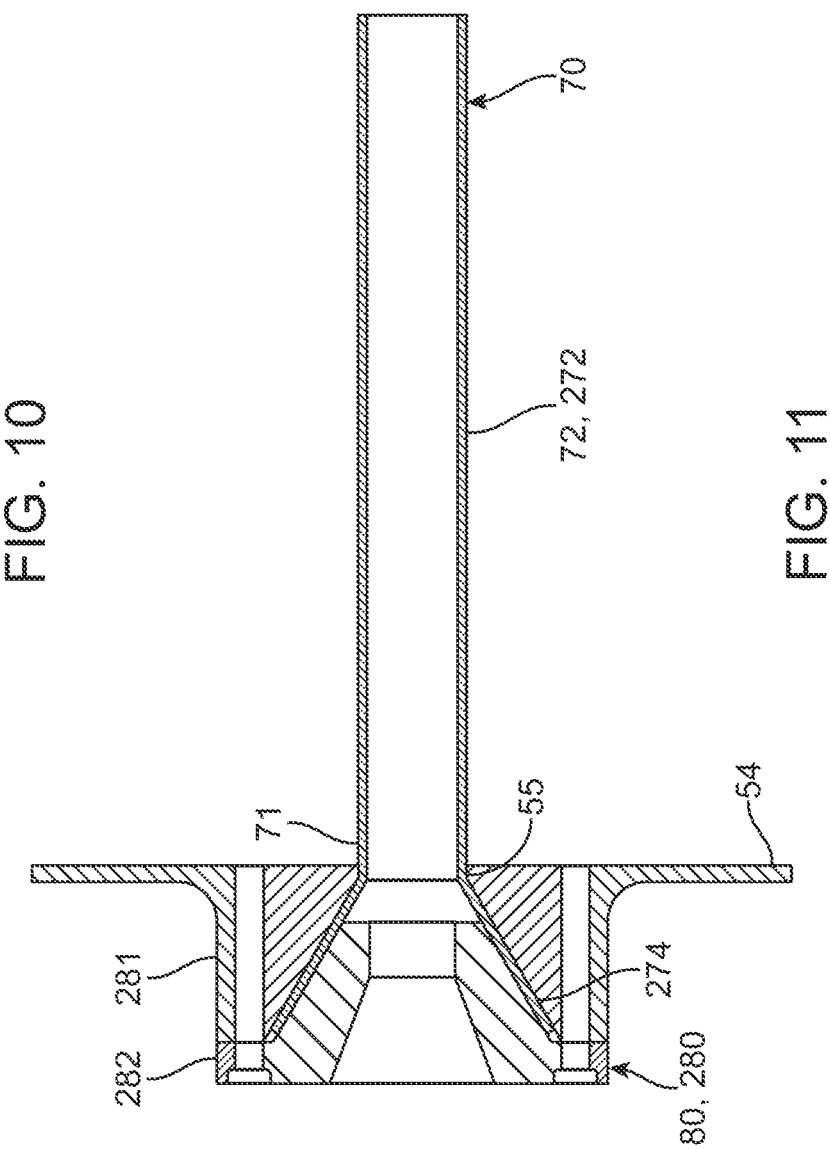
FIG. 10
FIG. 11

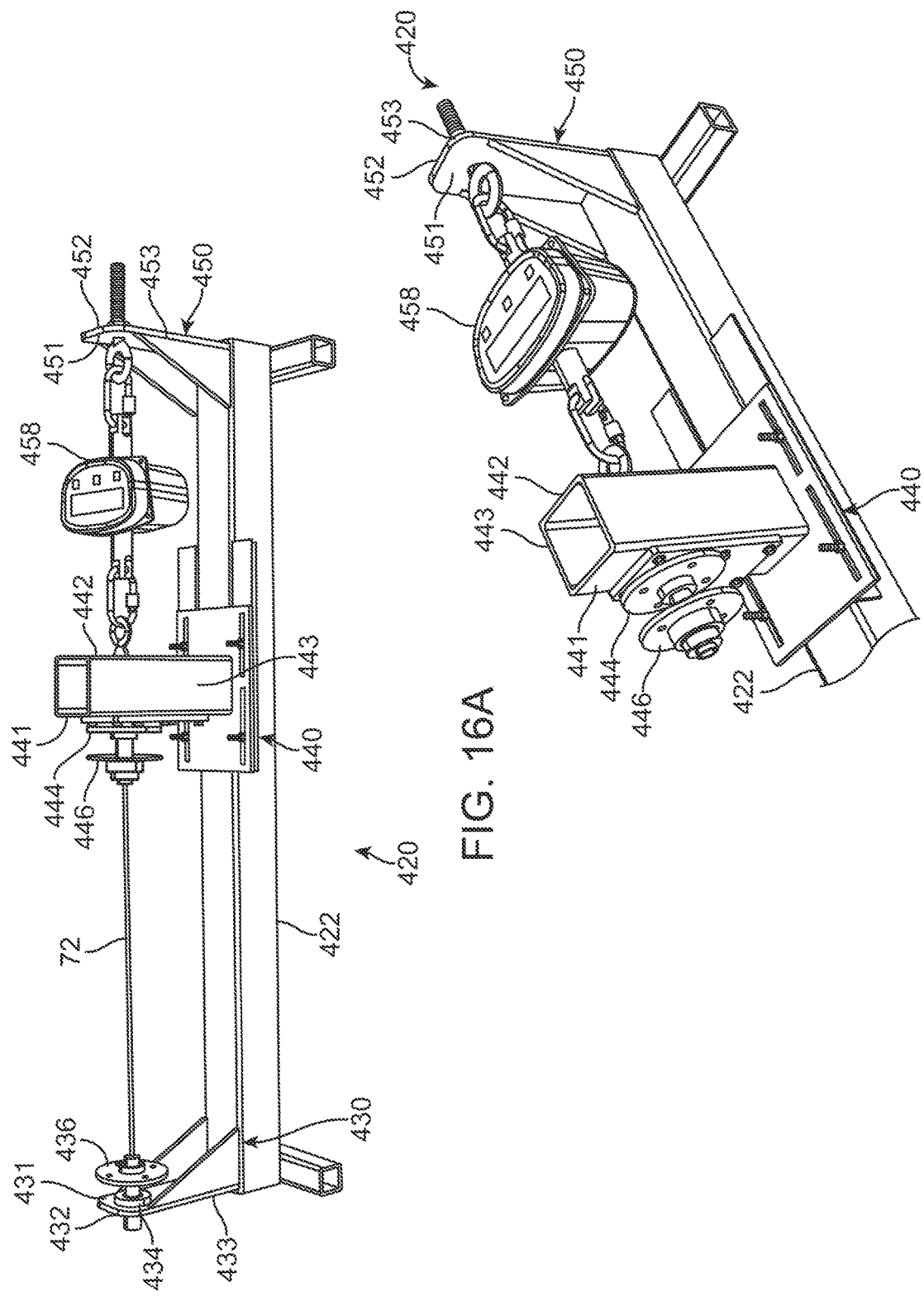

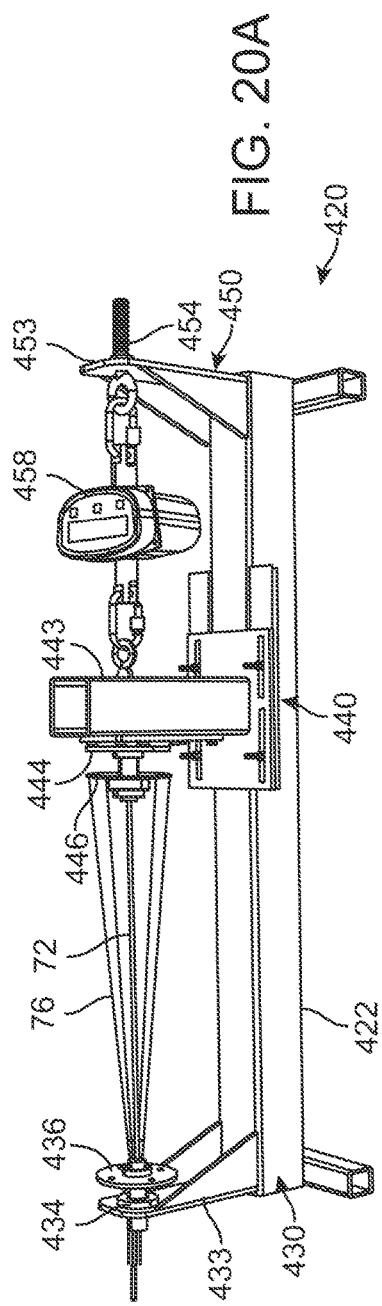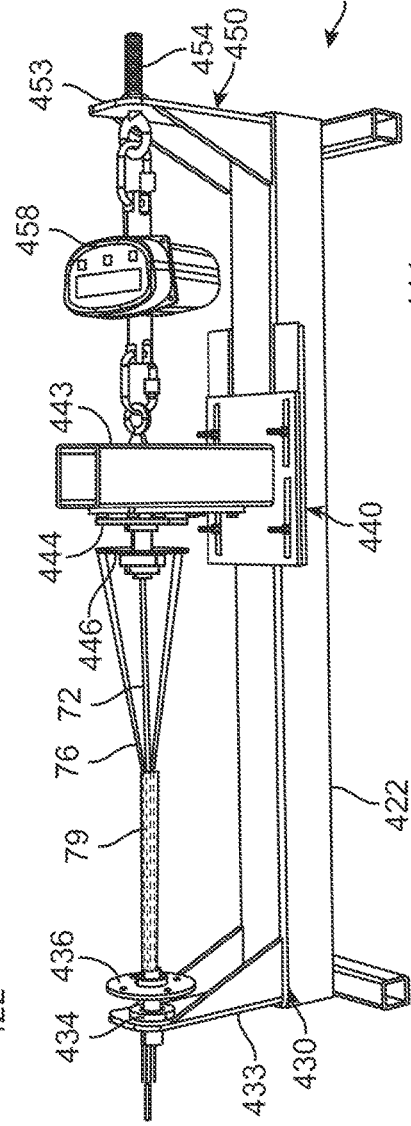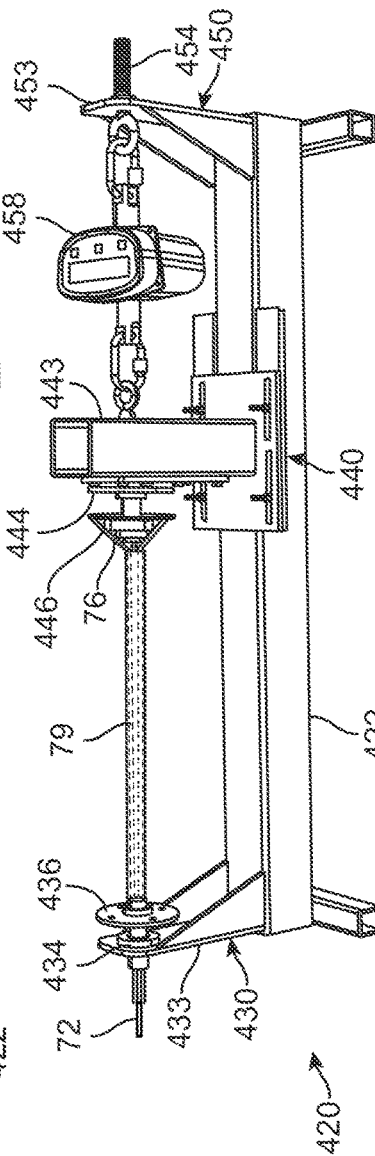

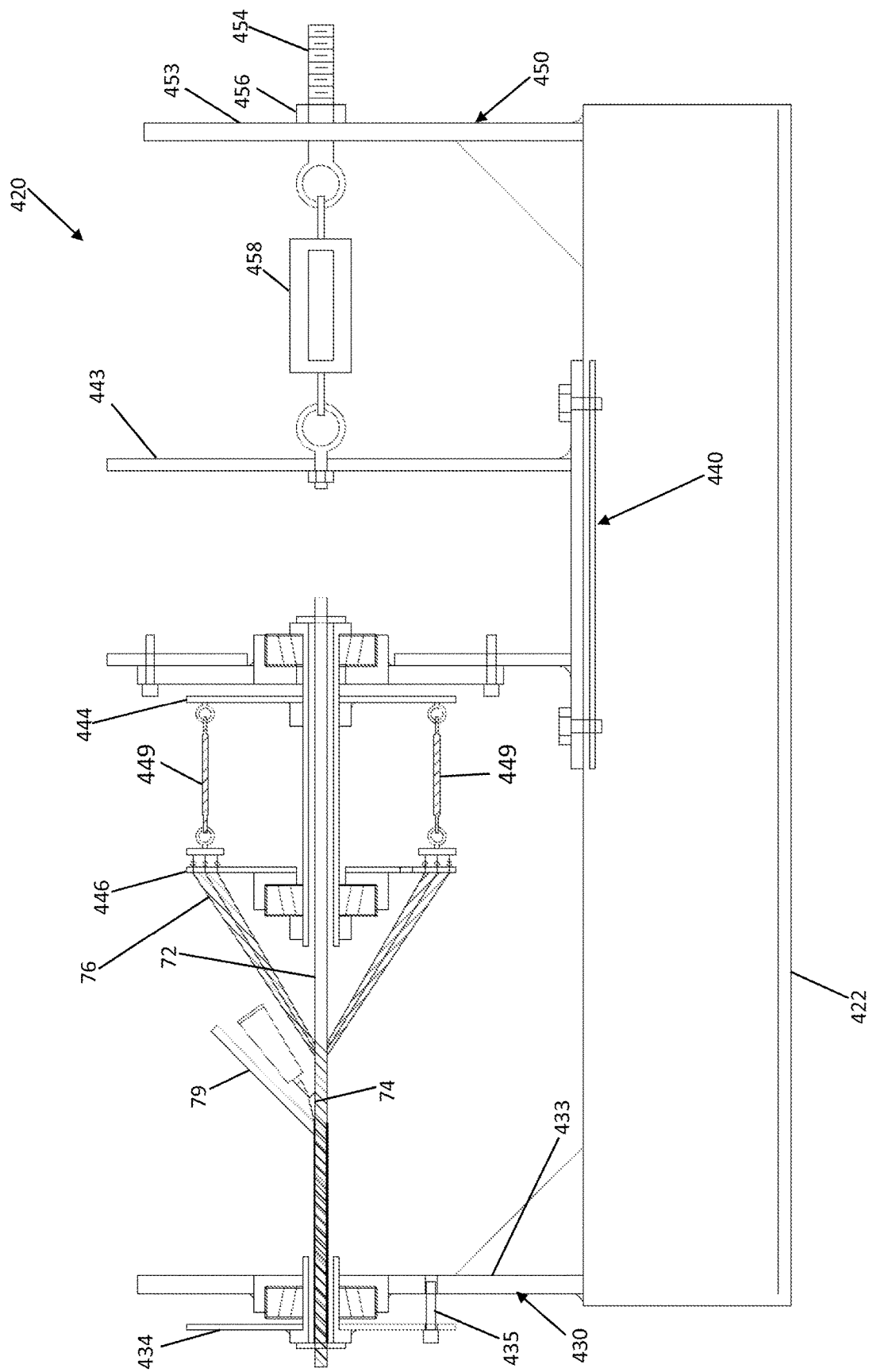

ELECTRICAL CONDUCTOR SYSTEM FOR A ROTOR BLADE AND METHOD OF MANUFACTURING THE ELECTRICAL CONDUCTOR SYSTEM

FIELD

The present application relates generally to an electrical conductor system for a rotor blade of a rotary wing aircraft.

BACKGROUND

Rotary wing aircraft may include electrical conductors to transmit electrical power or data to an outboard portion of a rotor blade. The electrical conductors may be wires permanently bonded to either the external surface of the rotor blade or internally within the blade (e.g., directly to the spar conic or to a tube (within the blade) filled with adhesive). Alternatively, flat or flexible conductor sheets may be bonded to the outside surface of the blade.

To secure the electrical conductor, conventional systems typically use non-rotating devices, such as a metal cable that is bonded or crimped to an anchor.

SUMMARY

Conventional electrical conductors are bonded to various portion of the rotor blade along their length, which causes these conventional electrical conductors to experience high strains due to the large amount of centrifugal force of, the large radial accelerations of, and the large bending displacements along the rotor blade. This causes the electrical conductors to have a high failure rate, a low reliability, and a shortened wire life and functionality due to wire fatigue and damage. Furthermore, since the electrical conductors are bonded to the rotor blade along their length, the electrical conductors require substantial time to be installed and are not easily repairable or replaceable. Repairing or replacing the electrical conductors may risk causing damage to the rotor blade, in particular to the spar conic. Additionally, the electrical conductors along the outside of the rotor blade decrease the aerodynamic performance of the rotor blade due to the change in the airfoil contours along the outside of the rotor blade. The present disclosure addresses these and other issues.

Various embodiments provide for an electrical conductor assembly for a rotor blade. The electrical conductor assembly includes a substrate and at least one electrical conductor. The substrate includes an inboard end portion and an outboard end portion. The at least one electrical conductor is attached to the substrate and extends between the inboard end portion and the outboard end portion. The at least one electrical conductor is configured to transmit electricity along a length of the rotor blade. The inboard end portion and the outboard end portion are structured such that when the electrical conductor assembly is installed within the rotor blade, the inboard end portion is securable relative to the rotor blade and the outboard end portion is movable relative to the rotor blade. The outboard end portion is configured to provide structural support to and carry a weight of the at least one electrical conductor under centrifugal force created when the rotor blade is rotated.

Various other embodiments provide for an anchor assembly for an electrical conductor assembly for a rotor blade. The electrical conductor assembly includes a substrate positionable partially within the rotor blade. The anchor includes a clamshell assembly and a pin. The clamshell assembly includes a first clamshell portion and a second clamshell portion. The first clamshell portion and the second clamshell portion are configured to together enclose at least a portion of an inboard end portion of the substrate. The pin extends through the first clamshell portion and the second clamshell portion. The pin is configured to attach to a bracket such that the clamshell assembly is rotatable relative to the bracket.

Various other embodiments provide for a method of manufacturing an electrical conductor assembly. The method includes attaching a substrate and at least one electrical conductor to a cable assembly machine, tensioning the substrate, and wrapping the at least one electrical conductor around the substrate. The at least one electrical conductor is wrapped around the substrate independent of the tension on the substrate.

These and other features (including, but not limited to, retaining features and/or viewing features), together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIG. 8A is a perspective view of a portion of the electrical conductor system of FIG. 2.

FIG. 8B is a side view of a portion of the electrical conductor system of FIG. 2.

FIG. 8C is a top, cross-sectional view of a portion of the electrical conductor system of FIG. 2.

FIG. 10 is a cross-sectional view of FIG. 9A.

FIG. 11 is a cross-sectional view of a portion of the electrical conductor system of FIG. 9A.

FIG. 16A is a perspective view of a cable assembly machine according to one embodiment.

FIG. 16B is a perspective view of a portion of the cable assembly machine of FIG. 16A.

FIGS. 20A, 20B and 20C are perspective views of a cable assembly machine according to one embodiment manufacturing an electrical conductor assembly.

FIG. 21 is a side, cross-sectional view of a cable assembly machine according to another embodiment manufacturing an electrical conductor assembly.

DETAILED DESCRIPTION

Referring to the figures generally, various embodiments disclosed herein relate to an electrical conductor system and method of making an electrical conductor system. The electrical conductor assembly of the electrical conductor system reliably transmits electrical power, data, and/or signals along the span of the rotor blade with less susceptibility to the stresses and strains from the rotor blade. Accordingly, compared to conventional electrical conductors for rotor blades, the various components of the electrical conductor system have an increased reliability and performance, a longer life, and a decreased weight (in particular compared to conventional electrical conductors that are bonded in a tube filed with adhesive).

Furthermore, because the electrical assembly is only mounted along its inboard end (and is mounted via the anchor assembly), the electrical conductor system (or component thereof) is easily repairable, maintainable, reworkable, and/or replaceable in the event of damage or failure of the electrical conductors. Accordingly, the electrical conductor system does not require invasive techniques to be repaired or replaced, unlike conventional electrical conductors. The electrical conductor system can also be retrofitted onto an existing rotor blade.

Additionally, the electrical conductor assembly is configured to fit within the rotor blade itself (rather than being positioned along an outer surface of the rotor blade). Accordingly, the outer mold line (OML) of the rotor blade is undisturbed by the electrical conductor system, and the electrical conductor system avoids impairing system performance, e.g., in terms of an impact or on the aerodynamic performance or drag of the rotor blade.

The configuration of the electrical conductor assembly and the anchor assembly of the electrical conductor system (as described further herein) avoids the need to bond the electrical conductors into or onto the rotor blades. Accordingly, if an electrical conductor fails, the electrical conductor assembly can be easily removed and reinstalled with a simple and robust attachment, rather than undergoing invasive repairs or discarding the entire rotor blade with the electrical conductor (which may be required with conventional electrical conductors and rotor blades).

Aircraft

Figure 1A:
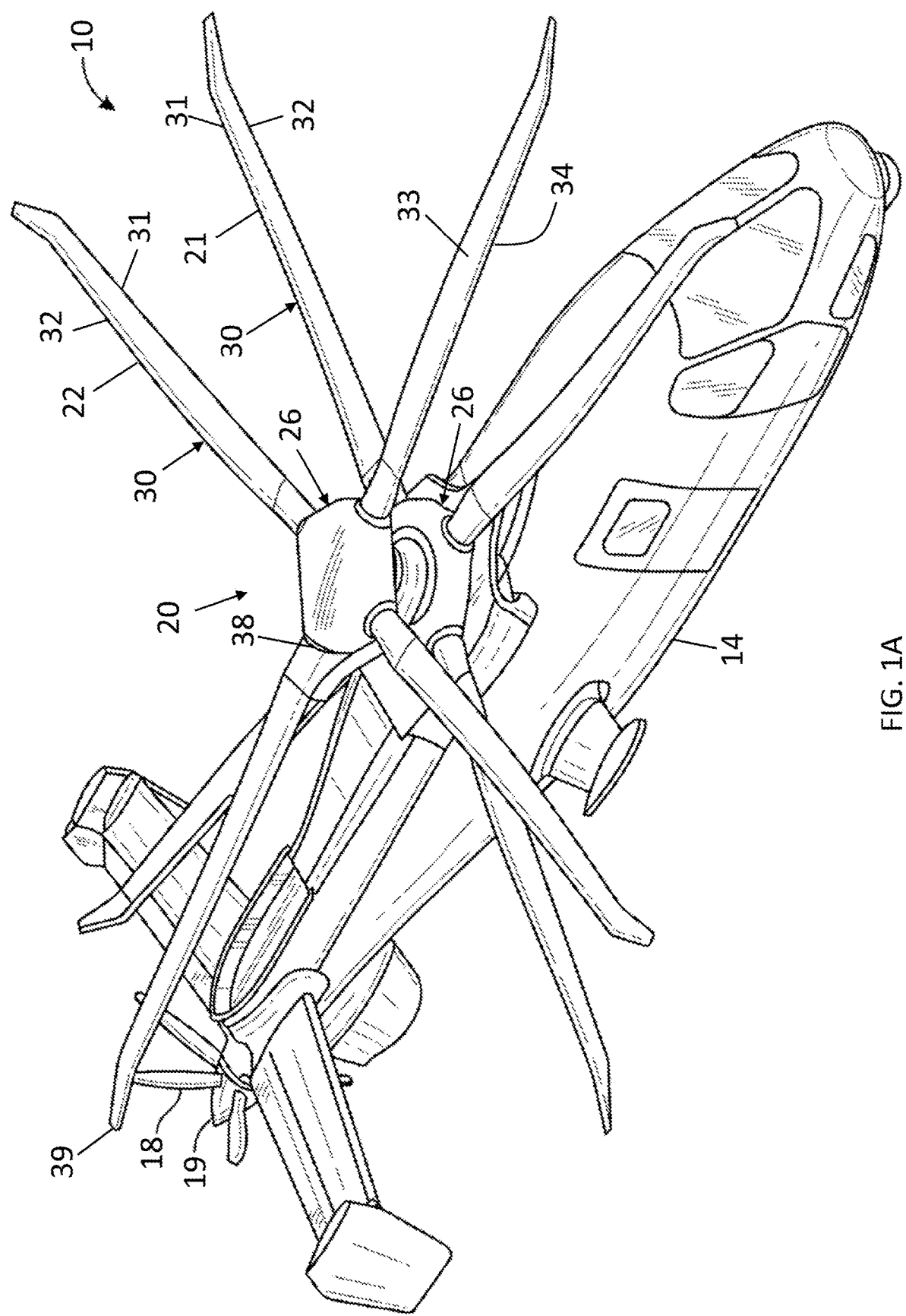
FIG. 1A is a perspective view of an aircraft according to one embodiment.
Figure 1B:
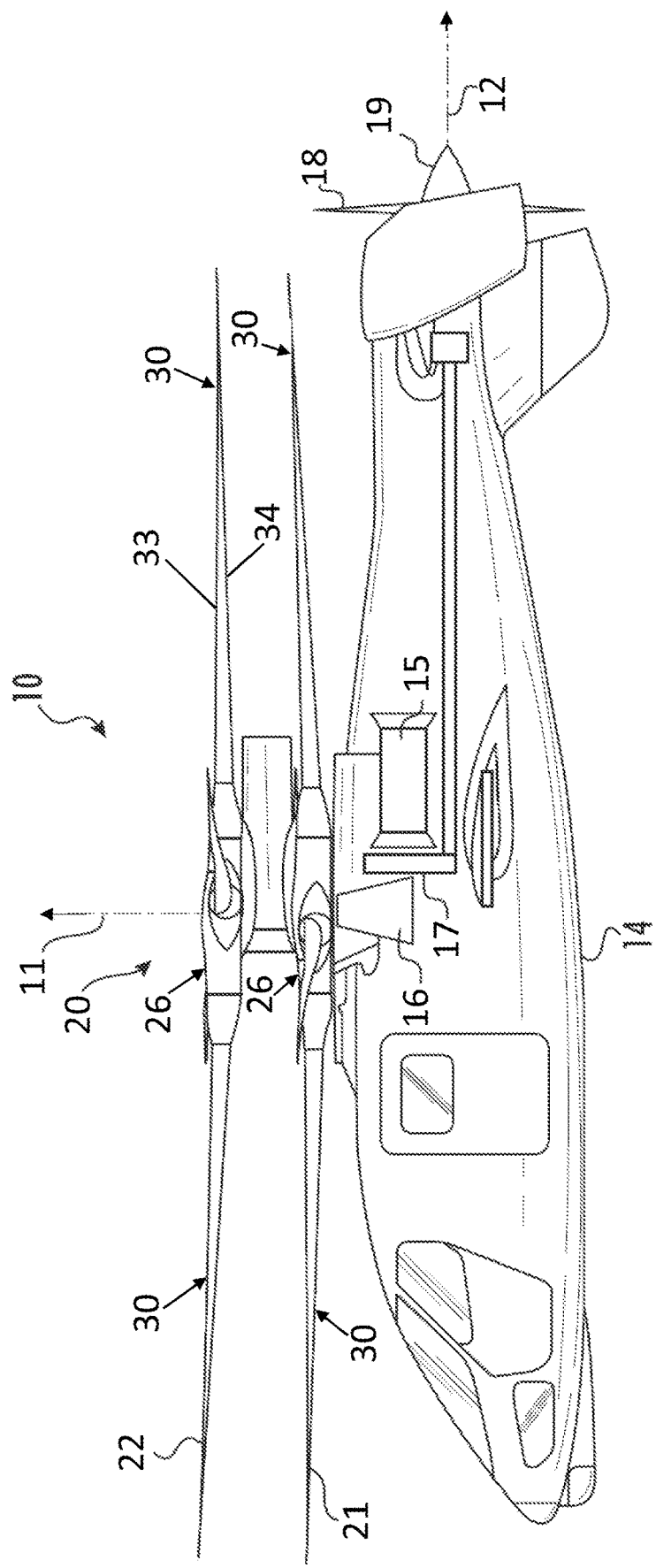
FIG. 1B is a side view of the aircraft of FIG. 1A.

FIGS. 1A-1B illustrate an exemplary vertical takeoff and landing (VTOL) high speed compound or coaxial counter-rotating rigid rotary wing aircraft 10 (which may be, for example, a helicopter or other aircraft which include at least one rotor blade). The aircraft 10 includes an aircraft body or airframe 14, a dual, counter-rotating, coaxial main rotor system 20, a translational thrust system 18, a transmission 16, and at least one engine 15 (which may be a gas turbine engine). The overall structure and configuration of the aircraft 10 may have a variety of different configurations, including but not limited to the structures disclosed in U.S. Pat. No. 10,822,076, the entirety of which is incorporated by reference for the systems and apparatus disclosed therein. The airframe 14 is a non-rotating frame (relative to the main rotor system 20 and the translational thrust system 18) and supports the main rotor system 20 and the translational thrust system 18.

The main rotor system 20 is driven by the transmission 16 and rotates about a central hub or rotor axis 11, as shown in FIG. 1B. The rotor axis 11 corresponds to the flapwise axis of the rotor blade 30. According to various embodiments as shown in FIGS. 1A-1B, the main rotor system 20 may be a coaxial rotor system that includes an upper rotor assembly 22 and a lower rotor assembly 21 as dual counter-rotating main rotors in a coaxial configuration. The upper rotor assembly 22 is positioned above the lower rotor assembly 21. The upper rotor assembly 22 and the lower rotor assembly 21 are rotated about the same, single axis (i.e., the rotor axis 11) and may include concentric hub shafts or masts. However, according to various other embodiments, the main rotor system 20 may not have coaxial upper and lower rotor assemblies 22, 21, and may only include one of the upper and lower rotor assemblies 22, 21.

As described further herein, the main rotor system 20 includes a plurality of main rotor blades 30 (e.g., a rotor blade spar), a plurality of mounting bracket assemblies 50, a plurality of electrical conductor systems 60, and at least one central rotor hub 26. In particular, each of the upper rotor assembly 22 and the lower rotor assembly 21 includes a set of rotor blades 30 and a central rotor hub 26 to which each of the rotor blades 30 is attached. The rotor system 20 is configured to rotate about the rotor axis 11 (thereby rotating the rotor blades 30 about the rotor axis 11).

The central rotor hub 26 (e.g., a hub body) is configured to rotate about and define the rotor axis 11 (thereby rotating the rotor blades 30, the mounting bracket assemblies 50, and the electrical conductor systems 60 about the rotor axis 11). The mounting bracket assemblies 50 are mounted to the rotor hub 26 (thereby indirectly attaching the rotor blades 30 and the electrical conductor systems 60 to the rotor hub 26). The rotor hub 26 includes a hub shaft or mast that extends upwardly along and around the rotor axis 11 and is rotated about the rotor axis 11 relative to the airframe 14 to rotate the rest of the rotor hub 26 (and thus the rotor blades 30) about the rotor axis 11.

The translational thrust system 18 provides translational thrust generally parallel to an aircraft longitudinal axis 12 (that extends along the length of the aircraft 10). The translational thrust system 18 may be selected from one of a plurality of propeller systems including, but not limited to a pusher propeller, a tractor propeller, a nacelle mounted propeller, propellers mounted on wings, etc. In the example of FIGS. 1A-1B, the translational thrust system 18 includes an auxiliary propulsor 19. In at least one embodiment, the auxiliary propulsor 19 is a pusher propeller system with a propeller rotational axis oriented substantially horizontal and parallel to the aircraft longitudinal axis 12 to provide thrust for high speed flight. The translational thrust system 18 may be driven through a main gearbox 17 which also drives the main rotor system 20.

The transmission 16 includes the main gearbox 17 driven by the one or more engines 15. The main gearbox 17 and the engines 15 may be mounted on the airframe 14 of the aircraft 10. Thus, the main gearbox 17 and engines 15 form part of the overall assembly including airframe 14. In the case of a rotary wing aircraft, the main gearbox 17 may be interposed between the one or more engines 15, the main rotor system 20, and the translational thrust system 18. In one embodiment, the main gearbox 17 is a split torque gearbox which carries torque from the engines 15 through a multitude of drivetrain paths.

Although a particular rotary wing aircraft configuration is illustrated and described in at least one disclosed non-limiting embodiment, other configurations and/or machines with rotor systems are within the scope of the present disclosure. It is to be appreciated that while the description herein relates to a rotary wing aircraft with a dual coaxial counter-rotating rotor system, the disclosure herein may be as readily applied to other rotor systems, such as turboprops, tilt-rotors, and tilt-wing aircraft, or a conventional single rotor system.

Rotor Blade

The rotor system 20 (in particular each of the rotor assemblies 21, 22) may include any number of rotor blades 30, such as three or four rotor blades 30, that rotate with the rotor hub 26 about the rotor axis 11. Each of the rotor blades 30 is directly mounted to a respective rotor hub 26 of the rotor assembly 21, 22. The rotor blades 30 are circumferentially spaced apart from each other about the respective rotor hub 26.

Figure 2:
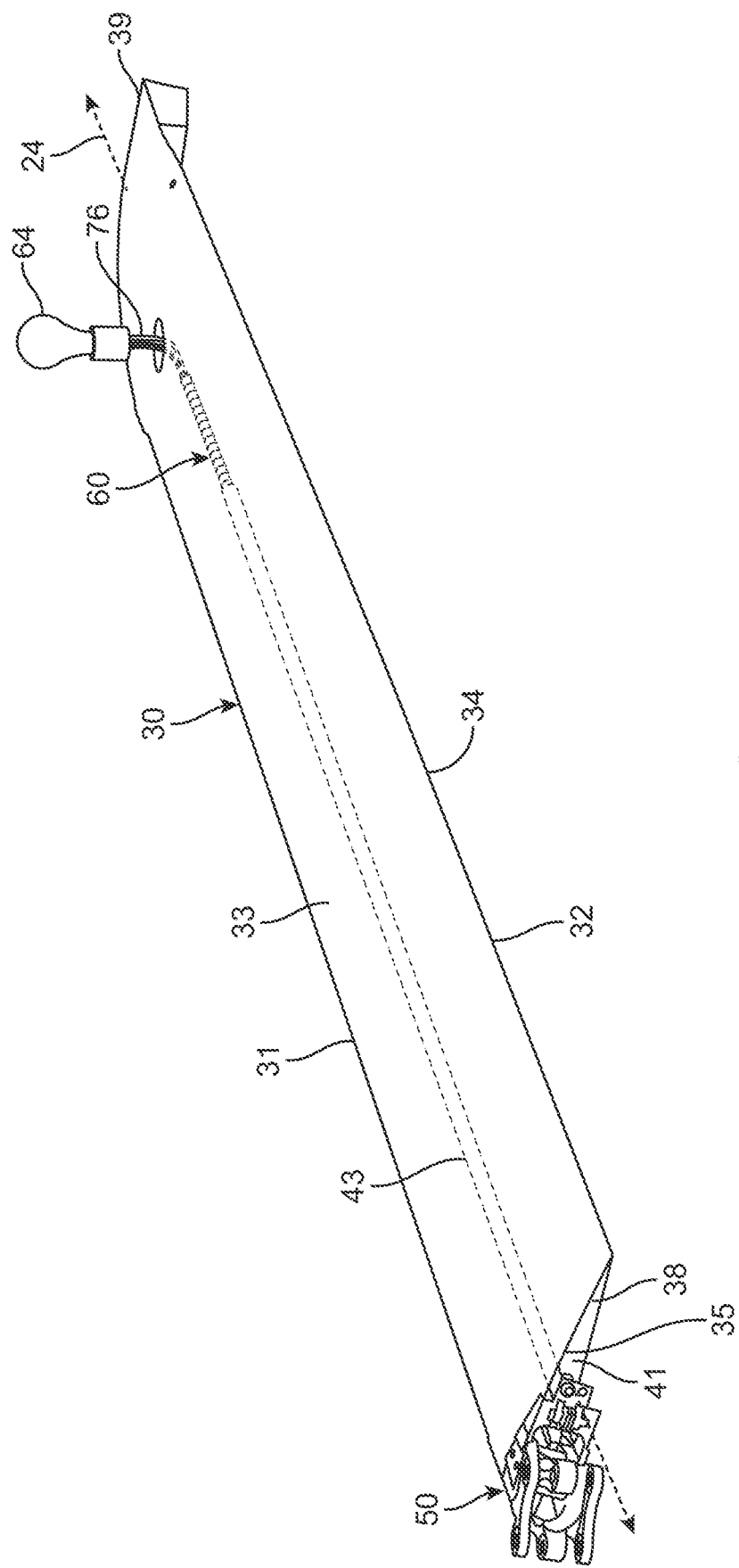
FIG. 2 is a perspective view of a rotor blade with a mounting bracket assembly and an electrical conductor system according to one embodiment that can be used with the aircraft of FIG. 1A.
Figure 3A:
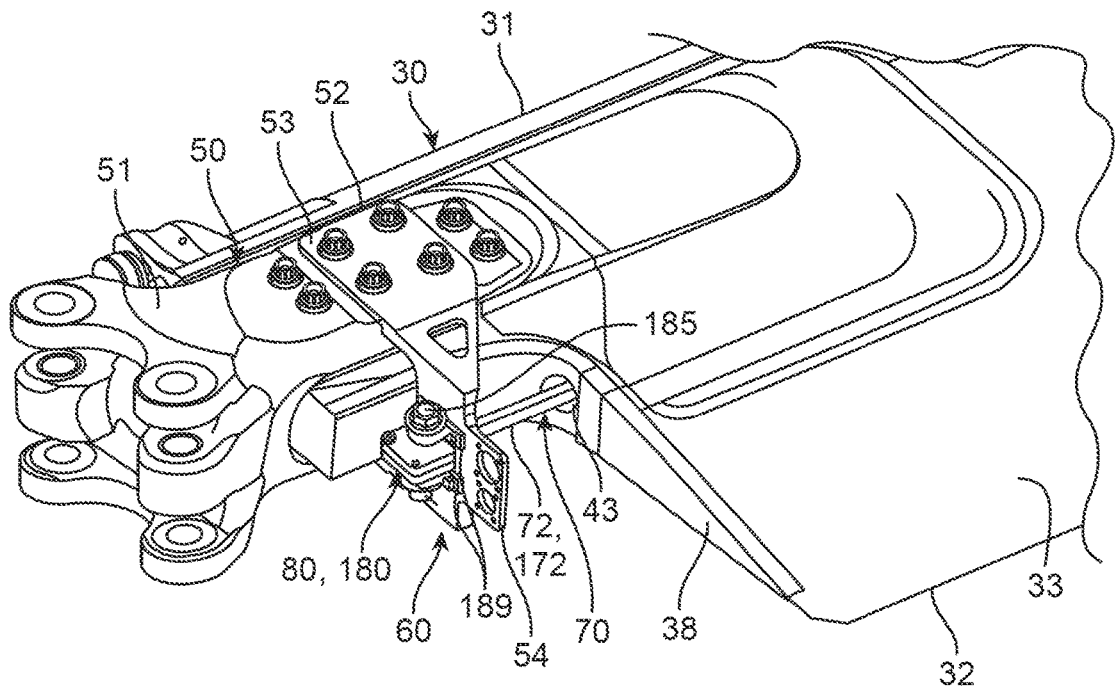
FIG. 3A is a perspective view of a portion of the rotor blade, the mounting bracket assembly, and the electrical conductor system of FIG. 2.
Figure 3B:
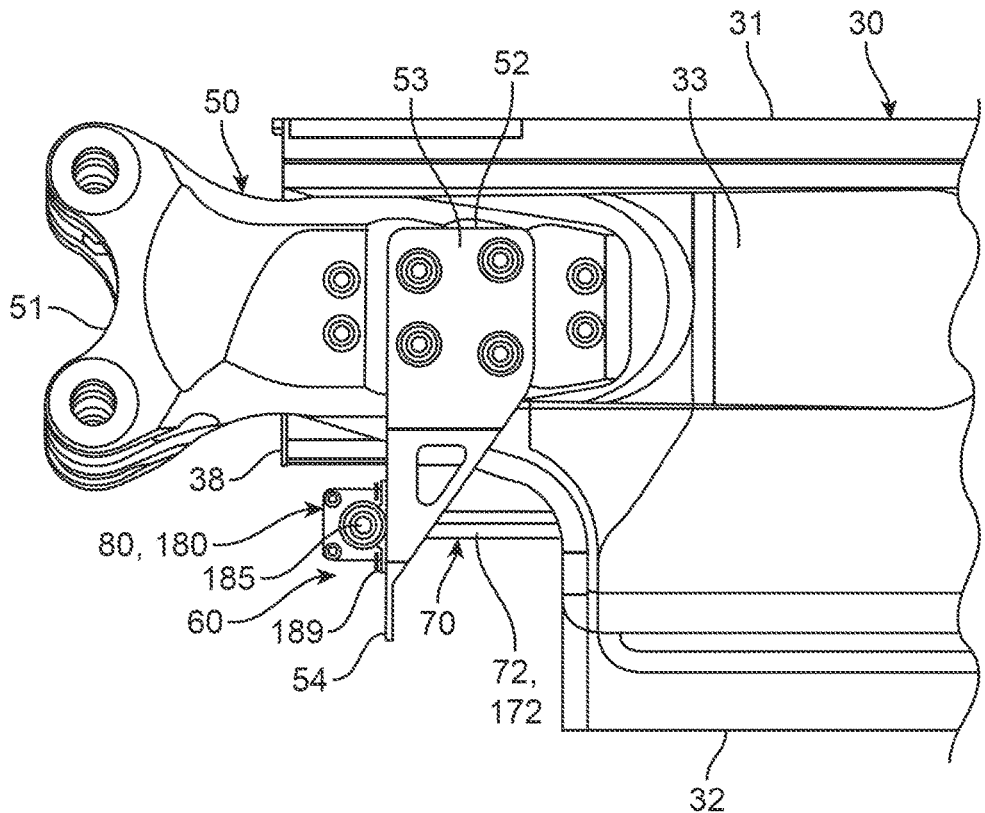
FIG. 3B is a top view of FIG. 3A.
Figure 3C:
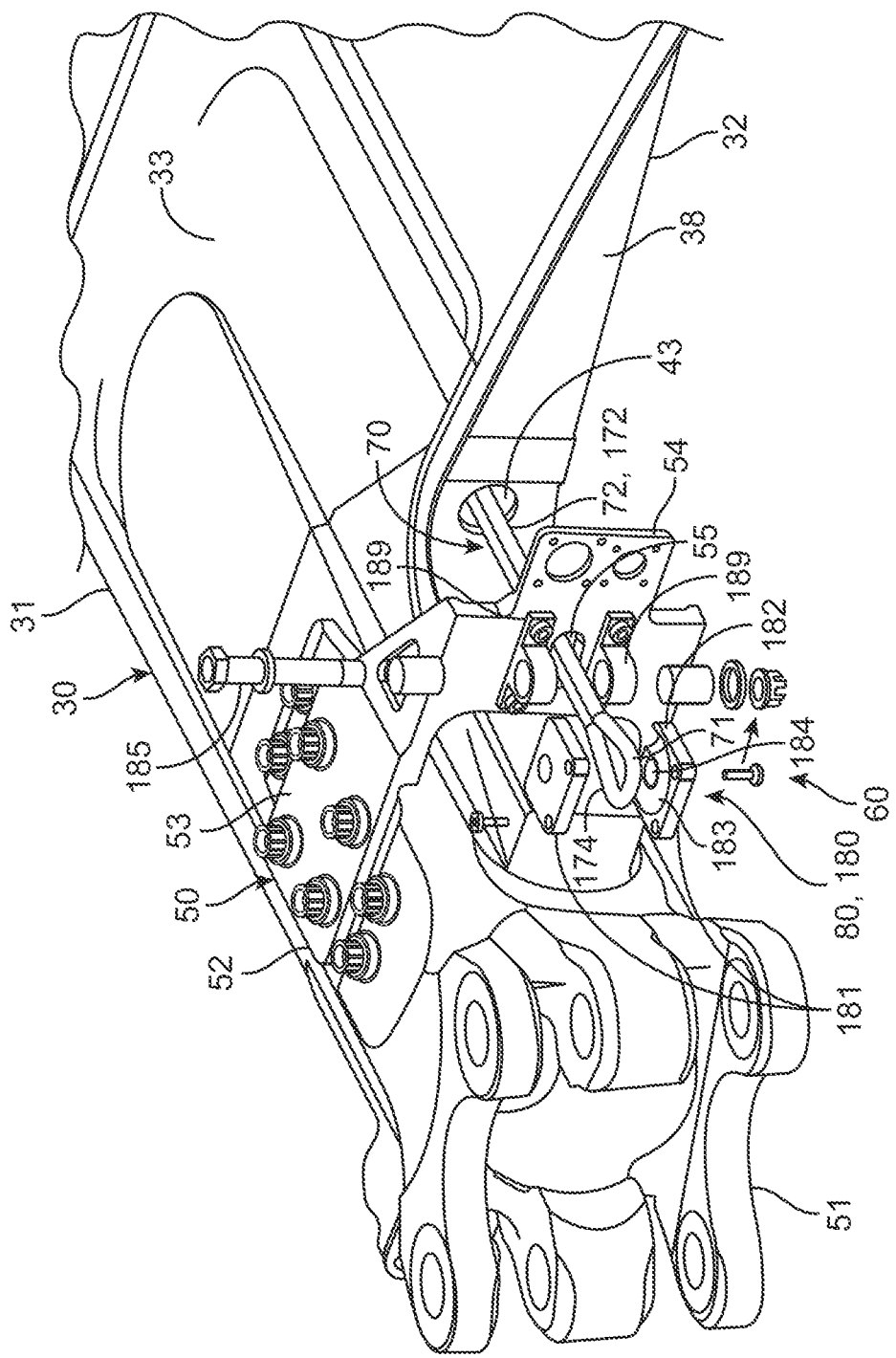
FIG. 3C is an exploded view of FIG. 3A.

As shown in FIGS. 1A and 2, the rotor blade 30 extends along its length between an inboard tip or end 38 (e.g., a root end) and an outboard tip or end 39 that are opposite each other. The inboard end 38 is radially closer to (and optionally directly connects to) the rotor hub 26 (as shown in FIG. 1A), and the outboard end 39 is radially further from the rotor hub 26 (and is the radially outermost portion of the rotor blade 30). As shown in FIGS. 3A-3C, the inboard end 38 may be positioned along different radial positions along its length (between the leading edge 31 and the trailing edge 32).

As shown in FIGS. 1A and 2, the rotor blade 30 includes a leading edge 31 and a trailing edge 32. The leading edge 31 is the upstream edge of the rotor blade 30, and the trailing edge 32 is the downstream edge of the rotor blade 30 in the rotational direction of travel of the rotor blade 30 about the rotor axis 11. The leading edge 31 and the trailing edge 32 each extend along the radial length of the rotor blade 30 and are opposite each other.

As shown in FIG. 1B, the rotor blade 30 further includes a top side or portion 33 and a bottom side or portion 34. The top portion 33 faces axially upward, away from the airframe 14. The bottom portion 34 faces axially downward, toward the airframe 14. The top portion 33 and the bottom portion 34 each extend along the radial length of the rotor blade 30, are opposite each other, and each extend between the leading edge 31 and the trailing edge 32 and between the inboard end 38 and the outboard end 39. Similarly, the leading edge 31 and the trailing edge 32 each extend between the top portion 33 and the bottom portion 34 and between the inboard end 38 and the outboard end 39, and the inboard end 38 and the outboard end 39 each extend between the leading edge 31 and the trailing edge 32 and between the top portion 33 and the bottom portion 34.

Figure 5A:
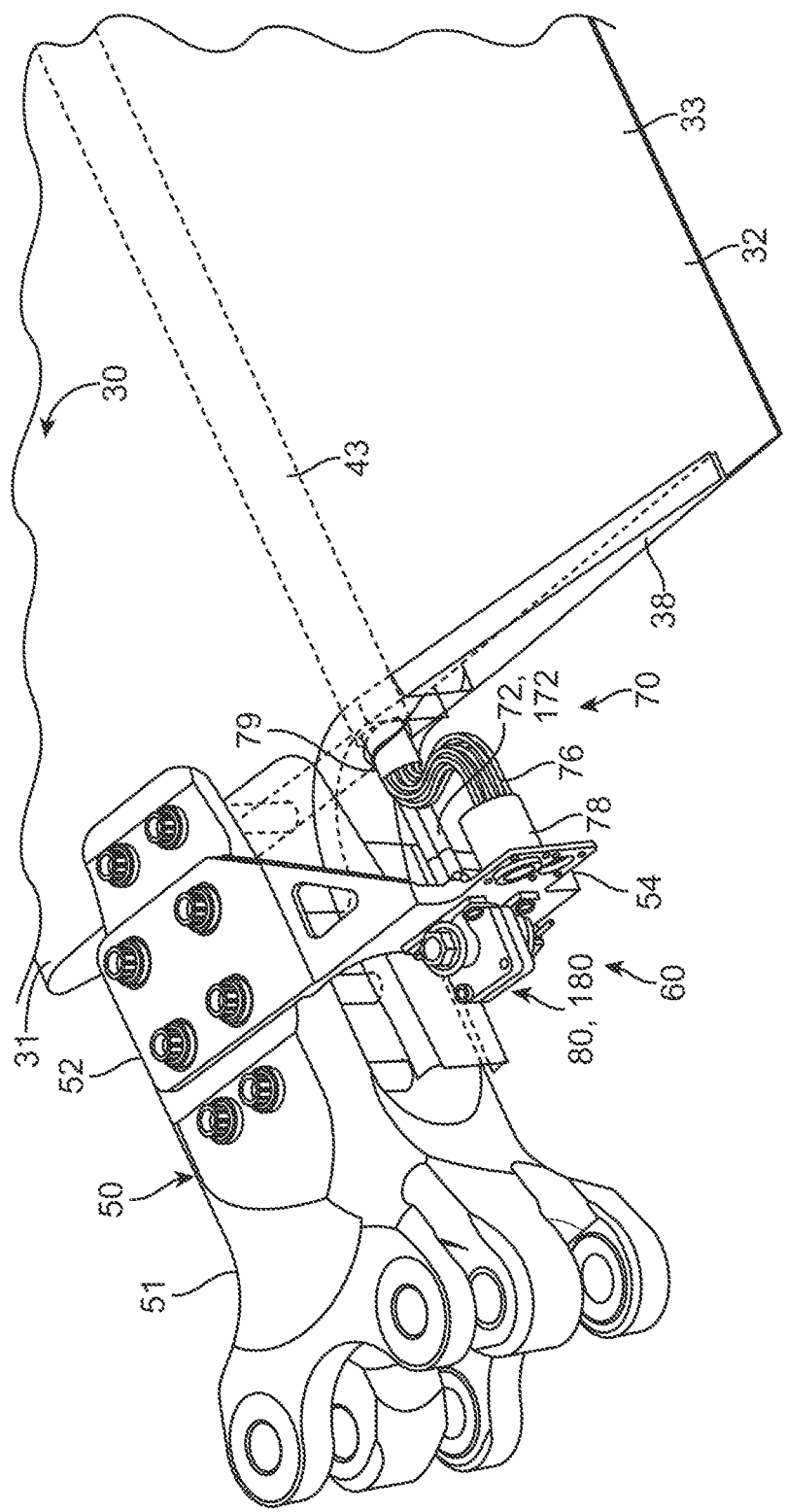
FIG. 5A is a perspective view of an inboard portion of FIG. 2.
Figure 5B:
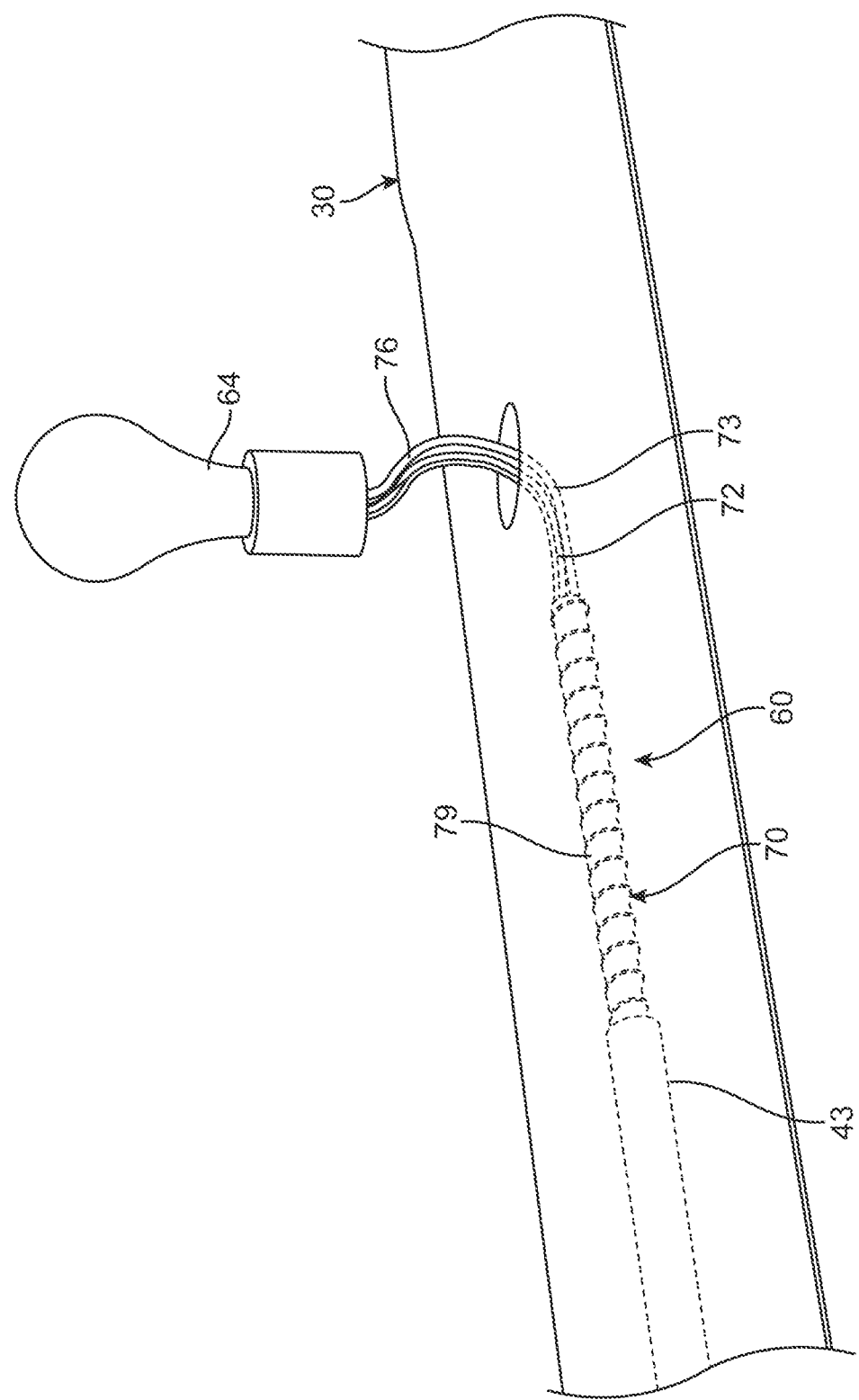
FIG. 5B is a perspective view of an outboard portion of FIG. 2.
Figure 6:
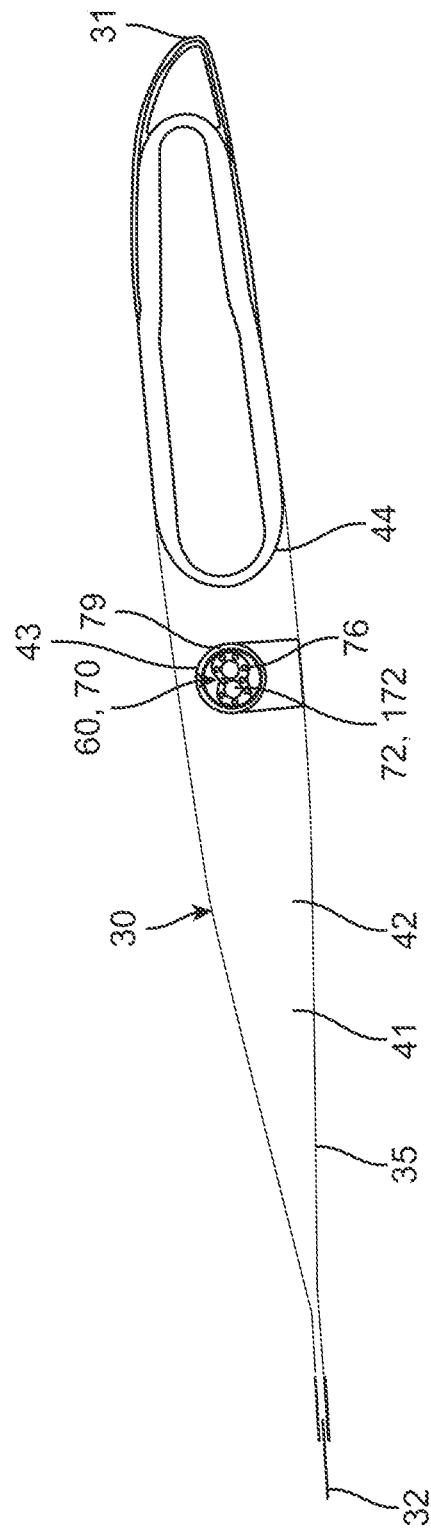
FIG. 6 is a cross-sectional view of FIG. 2.

As shown in FIG. 2, each of the rotor blades 30 has an outer wall 35 with an outer aerodynamic surface. At least a portion of the outer wall 35 of the rotor blade 30 defines an inner portion, cavity, or area 41. As shown in FIG. 6, the rotor blade 30 includes a core 42 and a spar conic 44 that are positioned within the inner area 41 of the rotor blade 30 and extend along at least a portion of the longitudinal length of the rotor blade 30. The spar conic 44 may be a primary structural member within the rotor blade 30. The core 42 is positioned outside of and at least partially surrounds the spar conic 44. The core 42 may optionally be constructed out a honeycomb support material. The core 42 defines a hole or conduit 43 that extends through the inboard end 38 of the rotor blade 30 and along at least a portion of the longitudinal length of the rotor blade 30 (as shown in FIGS. 2 and 5A-5B). The conduit 43 is configured to receive a portion of the electrical conductor system 60 (in particular a portion of the electrical conductor assembly 70).

The longitudinal, pitch, or feathering axis 24 of the rotor blade 30 refers to the axis about which the pitch angle of the rotor blade 30 is varied and the direction of centrifugal force of the rotor blade 30. In particular, the rotor blade 30 pitches, rotates, feathers, or twists about its feathering axis 24 to change the pitch angle, which changes the lift and drag. For example, by increasing the pitch angle, the rotor blade 30 provides more lift. Conversely, by decreasing the pitch angle, the rotor blade 30 provides less lift. The feathering axis 24 extends substantially perpendicular to the rotor axis 11.

Mounting Bracket Assembly

As shown in FIGS. 2-3C, each of the inboard support or mounting bracket assemblies 50 are configured to attach a respective one of the rotor blades 30 to the rotor hub 26. Each of the mounting bracket assemblies 50 may be directly mounted, fastened, or attached to a corresponding one of the rotor blades 30 and to the rotor hub 26. Since the rotor system 20 may include any number of rotor blades 30, the rotor system 20 includes the same number of mounting bracket assemblies 50 and rotor blades 30, such that each rotor blade 30 has a corresponding mounting bracket assembly 50. The mounting bracket assemblies 50 (and thus also the corresponding rotor blade 30) rotates with the rotor hub 26 about the rotor axis 11.

The mounting bracket assembly 50 includes a first inboard support or mounting bracket 51 and a second inboard support or mounting bracket 52. Both the first bracket 51 and the second bracket 52 are each configured to be statically attached or mounted to the rotor blade 30 (along an area along the inboard end 38) with fasteners (e.g., bolts). Each of the first bracket 51 and the second bracket 52 may be fastened to the rotor blade 30 along and extend along both the top portion 33 and the bottom portion 34 of the rotor blade 30.

The first bracket 51 and the second bracket 52 are each constructed as a single-piece (i.e., as a single, integral bracket) that comprises a single unitary component that cannot be separated without destruction. Although the first bracket 51 and the second bracket 52 are shown as two separate brackets that are attachable and securable to each other, the first bracket 51 and the second bracket 52 may optionally be constructed as a single-piece (i.e., as a single, integral bracket) that comprises a single unitary component that cannot be separated without destruction.

The first bracket 51 is configured to attach the rotor blade 30 to the rotor hub 26. Accordingly, the first bracket 51 extends from and beyond the inboard end 38 to attach to the rotor hub 26.

Figure 4:
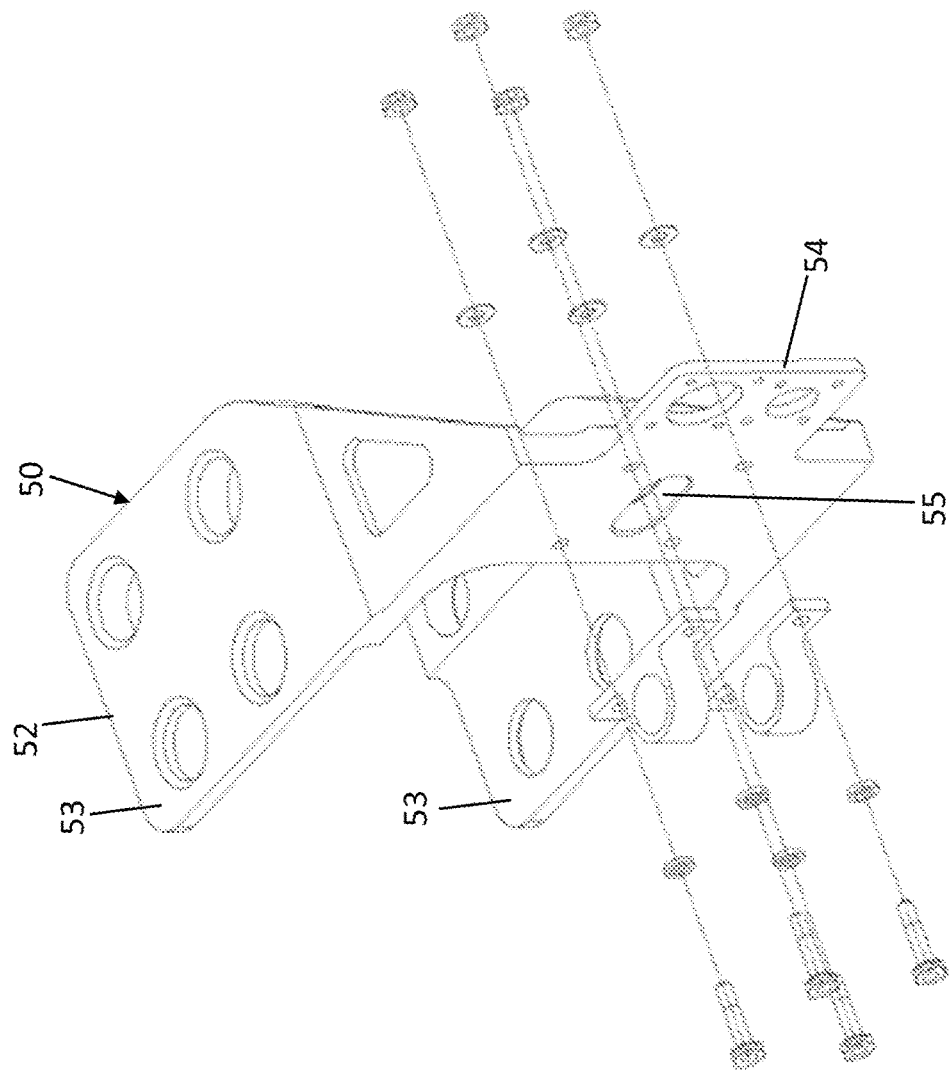
FIG. 4 is an exploded view of a portion of FIG. 3A.

The second bracket 52 is configured to attach and secure the electrical conductor system 60 to the rotor blade 30. Accordingly, the second bracket 52 extends along at least a portion of the inboard end 38 and is aligned with the conduit 43 of the rotor blade 30 (to receive the end of the electrical conductor assembly 70). As shown in FIG. 4, the second bracket 52 includes two plates 53 (i.e., a top plate and a bottom plate) that are each configured to extend along the top portion 33 and the bottom portion 34 of the rotor blade 30, respectively (thereby sandwiching a portion of the rotor blade 30 in between the two plates 53). Optionally, the two plates 53 may extend along the outer surfaces of corresponding plates of the first bracket 51 (that also extend along and are fastened to the top portion 33 and the bottom portion 34 of the rotor blade 30). The second bracket 52 is fastened to the rotor blade 30 through the two plates 53.

The second bracket 52 also includes an extension 54 that is positioned between the two plates 53 (along the height of the second bracket 52) and extends outwardly from the two plates 53. As shown in FIGS. 3C-4, the extension 54 defines a through-hole 55 that extends completely through the extension 54. The through-hole 55 is configured to receive a portion of the electrical conductor system 60 (in particular a portion of the structural member 72, as described further herein), as shown in FIG. 3C. Accordingly, the second bracket 52 is sized and positioned (relative to the rotor blade 30) to align the axes of the through-hole 55 of the extension 54 and the conduit 43 of the rotor blade 30 (through which the structural member 72 extends).

As shown in FIG. 4, the extension 54 further defines a number of other holes that are configured to provide areas to secure various structures to the second bracket 52, such as the anchor assembly 80 and the electrical connector 78 of the electrical conductors 76 (as shown in FIG. 5A and described further herein).

Electrical Conductor System

As shown in FIGS. 2 and 5A-5B, the electrical conductor system 60 is configured to transmit electrical power, data, and/or signals along the longitudinal length of the rotor blade 30, from the inboard end 38 toward or to the outboard end 39 of the rotor blade 30 (e.g., to an outboard half of the rotor blade 30) to power and/or control an onboard electrical device 64 that is on or near the outboard end 39 of the rotor blade 30. The output or electrical device 64 (which may include an outboard electrical connector) may be a variety of different onboard electrical devices (e.g., a light, a sensor, an actuator for flaps, a heater mat) that can be powered or controlled. As described further herein, the electrical conductor system 60 is configured to transmit power, data, and/or signals through the inside of the rotor blade 30 to the electrical device 64.

The electrical conductor system 60 may receive power, data, and/or signals along the inboard side of the electrical conductor system 60 (via the input or electrical connector 78, as described further herein) and along the inboard end 38 of the rotor blade 30, as shown in FIG. 5A. The power, data, and/or signals travels in an outboard direction along the length of the electrical conductor system 60 to power and/or control the electrical device 64 along or near the outboard end 39 of the rotor blade 30, as shown in FIG. 5B. As described further herein, each of the electrical conductor systems 60 includes an electrical conductor assembly 70 and an anchor assembly 80.

Each of the electrical conductor systems 60 are configured to attach to a respective one of the rotor blades 30. Since the rotor system 20 may include any number of rotor blades 30, the rotor system 20 includes the same number of electrical conductor systems 60 and rotor blades 30, such that each rotor blade 30 has a corresponding electrical conductor system 60. The electrical conductor systems 60 rotate with the corresponding rotor blade 30 (and thus with the rotor hub 26) about the rotor axis 11.

Although the electrical conductor systems 60 are shown herein with the main rotor blades 30, according to various other embodiments, the electrical conductor systems 60 may be used with other types of rotor blades, such as those within the translational thrust system 18.

Electrical Conductor Assembly

Figure 7A:
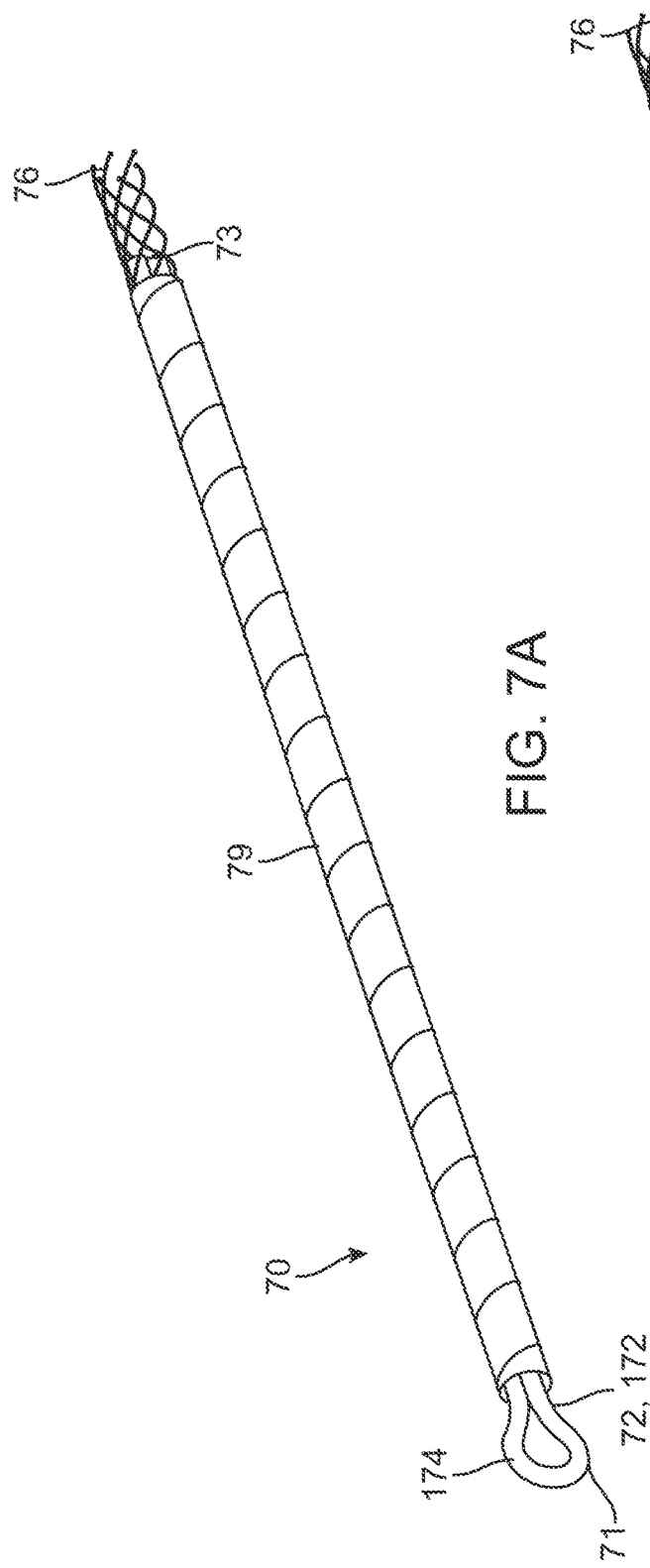
FIG. 7A is a perspective view of an electrical conductor assembly of the electrical conductor system of FIG. 2.
Figure 7B:
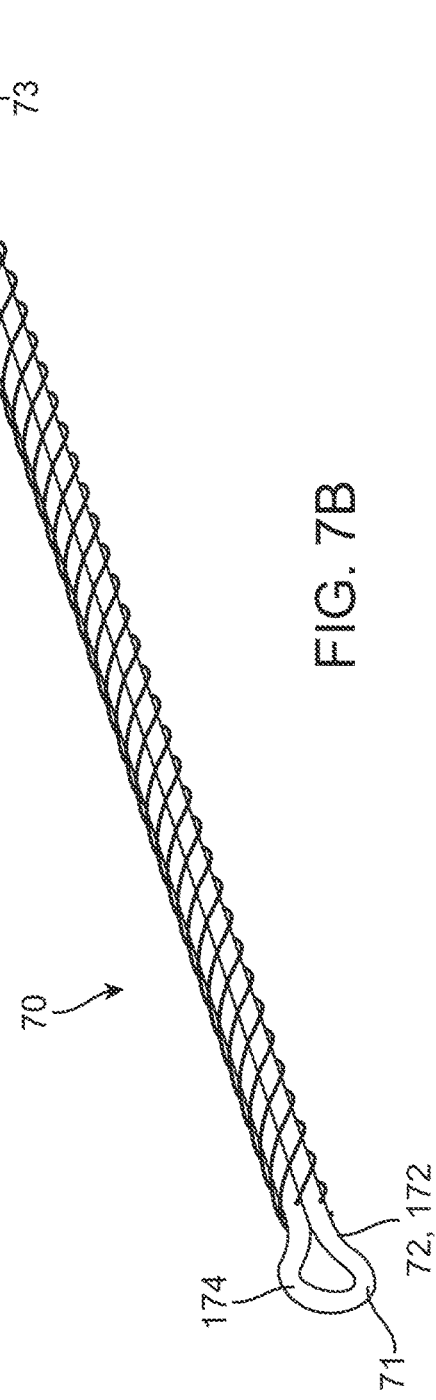
FIG. 7B is a perspective view of a portion of the electrical conductor assembly of FIG. 7A.
Figure 7C:
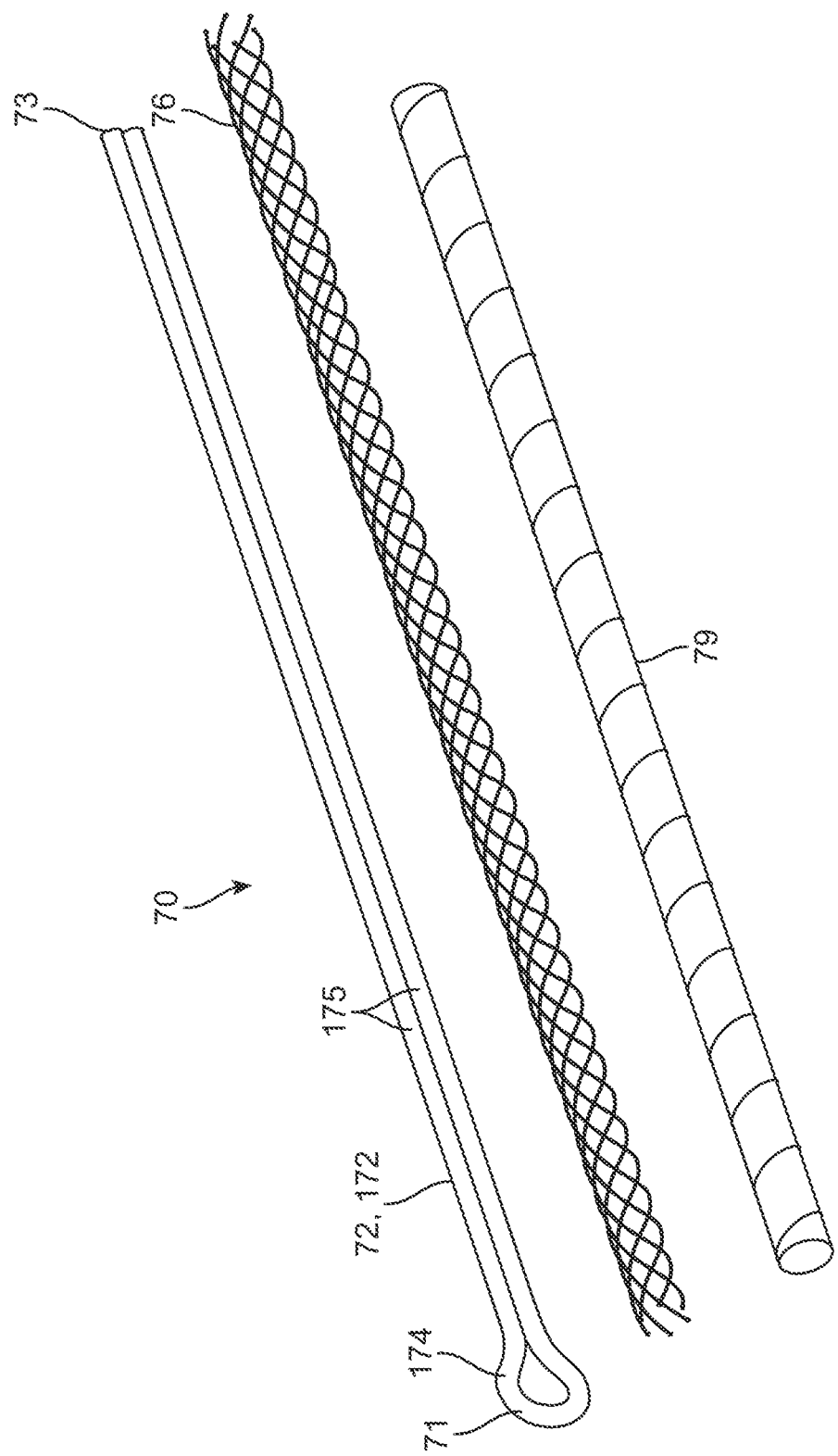
FIG. 7C is an exploded view of the electrical conductor assembly of FIG. 7A.

As shown in FIGS. 6-7C, each of the electrical conductor assemblies 70 includes a structural member 72 and at least one electrical conductor 76 that are each positionable at least partially within the rotor blade 30. The electrical conductor assembly 70 is an in-blade electrical structural and wiring harness to transmit power, data, and/or signals through the inside of the rotor blade 30.

Figure 18:
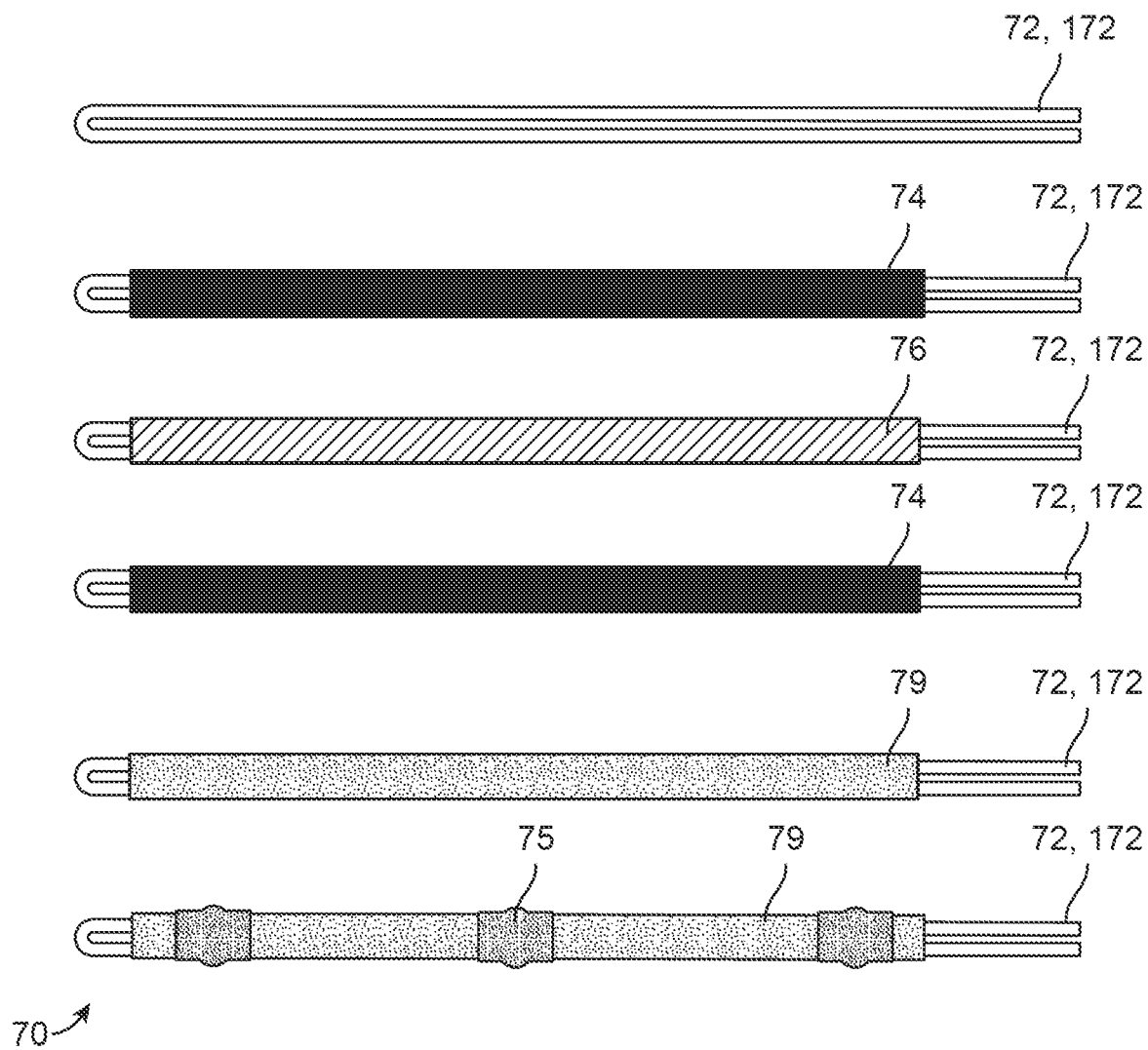
FIG. 18 are side views of an electrical conductor assembly being assembled according to one embodiment.

The one or more electrical conductors 76 are configured to transmit electricity (e.g., electrical power, data, and/or signals) along their lengths, and thus along a length of the rotor blade 30. The electrical conductor assembly 70 may include a plurality of electrical conductors 76 (which may be, for example, wires or cables). The electrical conductors 76 are attached and bonded to the structural member 72. As shown in FIG. 18, the electrical conductor assembly 70 may comprise sealant 74 (e.g., a flexible adhesive or elastomeric sealant) to adhere the electrical conductors 76 to the structural member 72. As shown in FIG. 7B, the electrical conductors 76 are wrapped around and bonded to the outer surface of the structural member 72.

The structural core or member 72 (which may be referred to as a substrate) is configured to provide structural support to and carry the weight of the electrical conductors 76, reducing the likelihood of breakage of the electrical conductors 76 under centrifugal forces. As shown in FIGS. 7A-7C, the structural member 72 comprises and extends along its length between a structural member inboard end portion 71 (e.g., a root end) and a structural member outboard end portion 73. The inboard end portion 71 is radially closer to the rotor hub 26 and the inboard end 38 of the rotor blade 30 (and is the radially innermost portion of the structural member 72). The outboard end portion 73 is radially further from the rotor hub 26 and the outboard end 39 of the rotor blade 30 (and is the radially outermost portion of the structural member 72). The inboard end portion 71 and the outboard end portion 73 are opposite each other. As shown in FIG. 7B, the electrical conductors 76 extend between the inboard end portion 71 and the outboard end portion 73.

As shown in FIGS. 3C and 5B, when the electrical conductor assembly 70 is fully assembled to the rotor blade 30, the inboard end portion 71 is configured to be positioned outside of the rotor blade 30 and the outboard end portion 73 is configured to be positioned inside of the rotor blade 30. Accordingly, since the electrical conductor assembly 70 does not extend along the outer surface of the rotor blade 30, the electrical conductor assembly 70 does not disrupt how aerodynamic the rotor blade 30 is.

The structural member 72 is configured to be secured, attached, or mounted relative to the rotor blade 30 only through the inboard end portion 71 via the anchor assembly 80 and the bracket assembly 50 (as described further herein). Accordingly, when the electrical conductor assembly 70 is installed within and to the rotor blade 30, the inboard end portion 71 is configured to be secured relative to the rotor blade 30 and the outboard end portion 73 is configured to be movable relative to the rotor blade 30. This configuration allows the outboard end portion 73 of the structural member 72 (as well as the outboard end portion of the rest of the structural member 72) to be free to move independently with respect to the rotor blade 30. The majority of the forces acting on the electrical conductor assembly 70 are imparted at an attachment near the inboard end portion 71 of the electrical conductor assembly 70, allowing the rest of the electrical conductor assembly 70 to deform (and stretch) independent of the rotor blade 30. The outboard end portion 73 is configured to provide structural support to and carry a weight of the electrical conductor assembly 70 under centrifugal force created when the rotor blade 30 is rotated.

Since the electrical conductor assembly 70 is only secured to the rotor blade 30 via the inboard end portion 71 of the structural member 72 (and since the electrical conductors 76 are not bonded to the rotor blade 30 itself), the electrical conductor assembly 70 (in particular the structural member 72) is configured to be attachable to, removable from, and reattachable to the rotor blade 30. By being easily removable from the rotor blade 30, the electrical conductor assembly 70 can be easily repaired or replaced.

The structural member 72 provides the primary structural load path to react to the centrifugal forces acting on the electrical conductors 76, thereby reducing any strain exerted onto the electrical conductors 76. Accordingly, the structural member 72 is compliant to withstand the deformation that is inherent in rotor blade motion.

The structural member 72 may be, for example, a high strength synthetic fiber, rope (e.g., 5/16 inch diameter Vectran™ rope, which is a liquid crystal polymer multifilament yarn made by Kuraray America, Inc. of Houston, TX), cord (e.g., a synthetic fiber braided cord), cable, wire, cured composite structure (e.g., a composite tube or beam), or a pre-impregnated composite material (e.g., fiberglass or carbon fiber). According to one embodiment, the structural member 72 may be approximately 18-26 feet long. The structural member 72 may optionally be at least partially flexible. Conventional electrical conductors may use heavy metal cables for additional strength that is bonded to an anchor for retention. By using the structural member 72, the overall weight of the electrical conductor assembly 70 is much lighter (compared to using metal cables), which reduces the overall load on the attachment between the electrical conductor assembly 70 and the rotor blade 30 and allows the anchor assembly 80 to be lighter and easier to manufacture.

Furthermore, the structural member 72 is configured to carry the centrifugal force or loads generated by the electrical conductors 76. The centrifugal force from the electrical conductors 76 is transferred to the structural member 72 through adhesive and/or friction between the electrical conductors 76 and the structural member 72. Loads from the structural member 72 (in particular all centrifugal forces generated by the electrical conductor assembly 70) are transferred from the inboard end portion 71 to the rotor blade 30 via the anchor assembly 80 and the second bracket 52 (as described further herein) that are near or along the inboard end 38 of the blade 30.

According to one embodiment as shown in FIGS. 7A-7C, the structural member 72 is a looped structural member 172 (where the structural member 72 has multiple layers in a cross-section thereof). The looped structural member 172 may have all of the features, aspects, and components of the conical structural member 272, unless otherwise noted in the description herein. The looped structural member 172 is doubled over itself such that the inboard end portion 71 comprises a loop 174 of the looped structural member 172 (which forms the multiple layers of the substrate). The loop 174 provides an area for the looped structural member 172 to simply and robustly attach to the anchor assembly 80, as described further herein. Since the looped structural member 172 is doubled over itself, the looped structural member 172 comprises two portions 175 that extend next to each other between (and defining) the inboard end portion 71 and the outboard end portion 73, as shown in FIG. 7C. The two portions 175 may extend substantially parallel to each other and may optionally be bonded together along their lengths (with, for example, an elastomeric sealant), while being movable together relative to the rotor blade 30, in particular along the outboard end portion 73.

Optionally, the electrical conductor assembly 70 comprises an overwrap 79 (e.g., compression tape) to provide additional clamping pressure (e.g., friction) between the electrical conductors 76 and the structural member 72. As shown in FIGS. 6 and 7A, the overwrap 79 circumferentially covers or is wrapped around (in, for example, a spiral) at least a portion of the electrical conductors 76, such that at least a portion of both the electrical conductors 76 and the structural member 72 is positioned within the overwrap 79. The overwrap 79 also provides abrasion resistance and protection to the electrical conductors 76 and may flex with the structural member 72.

Anchor Assembly

As shown in FIGS. 3A-3C, the attachment, connection, or anchor assembly 80 is configured to removably and reattachably retain, secure, or attach the electrical conductor assembly 70 to the rotor blade 30 by removably and reattachably attaching to the inboard end portion 71 of the structural member 72 and to the second bracket 52. The anchor assembly 80 attaches the electrical conductor assembly 70 to the rotor blade 30 via the second bracket 52, along the inboard end 38 of the rotor blade 30. Furthermore, the anchor assembly 80 allows the electrical conductor assembly 70 to move and rotate relative to the rotor blade 30 when fully assembled and installed onto the rotor blade 30.

The various components of the anchor assembly 80 are similar to manufacture than conventional anchors for metal cables. By using the structural member 72 (as described further herein), which is lighter than metal cables used with conventional electrical conductors, the structural member 72 does not exert as much load onto the anchor assembly 80, which allows the various components of the anchor assembly 80 to be made more inexpensively and with more readily available materials without a weight penalty.

According to one embodiment as shown in FIGS. 3C and 8A-8B, the anchor assembly 80 is a clamshell anchor assembly 180 that is configured to attach and secure the inboard end portion 71 of the looped structural member 172 to the extension 54 of the second bracket 52. The conical anchor assembly 280 may have all of the features, aspects, and components of the clamshell anchor assembly 180, unless otherwise noted in the description herein. The clamshell anchor assembly 180 includes a clamshell assembly 182 and a pin 185 to attach the electrical conductor assembly 70 (in particular with the looped structural member 172) to the second bracket 52 (and thus to the rotor blade 30). The clamshell assembly 182 includes two clamshell portions 181 (i.e., a first clamshell portion and a second clamshell portion) that may optionally be identical to each other and attachable to each other. The clamshell portions 181 are configured to together enclose at least a portion of the inboard end portion 71 of the structural member 72, in particular the loop 174 of the looped structural member 172.

As shown in FIGS. 3C and 8C, each of the clamshell portions 181 defines a groove 183 (i.e., a first groove and a second groove) to receive and secure the loop 174. Each of the grooves 183 is configured to receive opposite sides of the inboard end portion 71. In particular, the grooves 183 are each rounded along their length such that each of the grooves 183 are configured to receive opposite sides of the loop 174 of the looped structural member 172 along the inboard end portion 71. The grooves 183 thus maintain the desired radius of the loop 174 around the pin 185, which ensures the strength of attachment between the clamshell assembly 182 and the looped structural member 172. The grooves 183 are also curved along their width (as a semicircle and along a cross-section of the clamshell portion 181) to receive one side of the loop 174.

As shown in FIGS. 8A and 8C, the groove 183 has two ends that extend along one side of the clamshell portion 181. The two ends provide areas for the two portions 175 of the looped structural member 172 to extend into the round area defined by the two grooves 183 that is directly between the two clamshell portions 181. The groove 183 also extends in a curved manner between the two ends along a face or side of the clamshell portion 181.

When assembled, the two clamshell portions 181 are fastened together such that the grooves 183 directly face each other and are aligned with each other, thereby creating a circular and enclosed conduit to sandwich and secure the loop 174 therebetween. The loop 174 of the looped structural member 172 is positioned within the two grooves 183 and between the two clamshell portions 181. By enclosing the loop 174, the clamshell assembly 182 also provides environmental protection for the loop 174 by limiting exposure to ultraviolet rays, moisture, dust, and debris.

The pin 185 (e.g., a shear pin) is configured to attach the clamshell assembly 182 to the second bracket 52. Accordingly, the pin 185 extends through the two clamshell portions 181 and attaches to the second bracket 52 in a manner such that the clamshell assembly 182 is rotatable relative to the second bracket 52 (and thus relative to the rotor blade 30). For example, the pin 185 may be rotatably attached to the second bracket 52 and/or rotatably attached to the clamshell assembly 182. By allowing the inboard end portion 71 to rotate relative to the rotor blade 30 and the outboard end portion 73 to be free to move relative to the rotor blade, the electrical conductor assembly 70 can align with forces while being used, thereby protecting the integrity of the electrical conductor assembly 70.

To attach to the pin 185, each of the clamshell portions 181 defines a hole 184 (e.g., a first hole and a second hole), as shown in FIGS. 3C and 8B-8B. The hole 184 is configured to receive the pin 185 such that the pin 185 extends through both of the clamshell portions 181. As shown in FIG. 8C, the hole 184 is positioned within an area defined by the groove 183 (and a side of the clamshell portion 181). Accordingly, the groove 183 extends around the hole 184 along its length. The pin 185 may optionally be rotatably attached and secured within the holes 184 such that the clamshell assembly 182 is rotatable relative to the pin 185.

As shown in FIGS. 3A-3C, the pin 185 is attached to the second bracket 52 along its opposite end portions. Optionally, the clamshell anchor assembly 180 may include two clamps 189 that are configured to receive and secure the two opposite end portions of the pin 185. The two clamps 189 are each configured to be fastened (e.g., bolted) to the extension 54 of the second bracket 52. The pin 185 may optionally be rotatably attached and secured to the clamp 189 such that the pin 185 is rotatable relative to the second bracket 52.

When the looped structural member 172 is secured to (and within) the clamshell assembly 182, the clamshell assembly 182 transfers the load from the electrical conductor assembly 70 to the pin 185. The pin 185 subsequently transfers the load to the second bracket 52, which transfers the load to the area along the inboard end 38 of the rotor blade 30.

Conical Structural Member

According to one embodiment as shown in FIGS. 9A-12C, the structural member 72 is a conical structural member 272, and the anchor assembly 80 is a conical anchor assembly 280 that is configured to attach and secure the inboard end portion 71 of the conical structural member 272 to the extension 54 of the second bracket 52. The conical structural member 272 may have all of the features, aspects, and components of the looped structural member 172 and the spiral structural member 372, unless otherwise noted in the description herein. The conical anchor assembly 280 may have all of the features, aspects, and components of the clamshell anchor assembly 180, unless otherwise noted in the description herein.

Figure 9A:
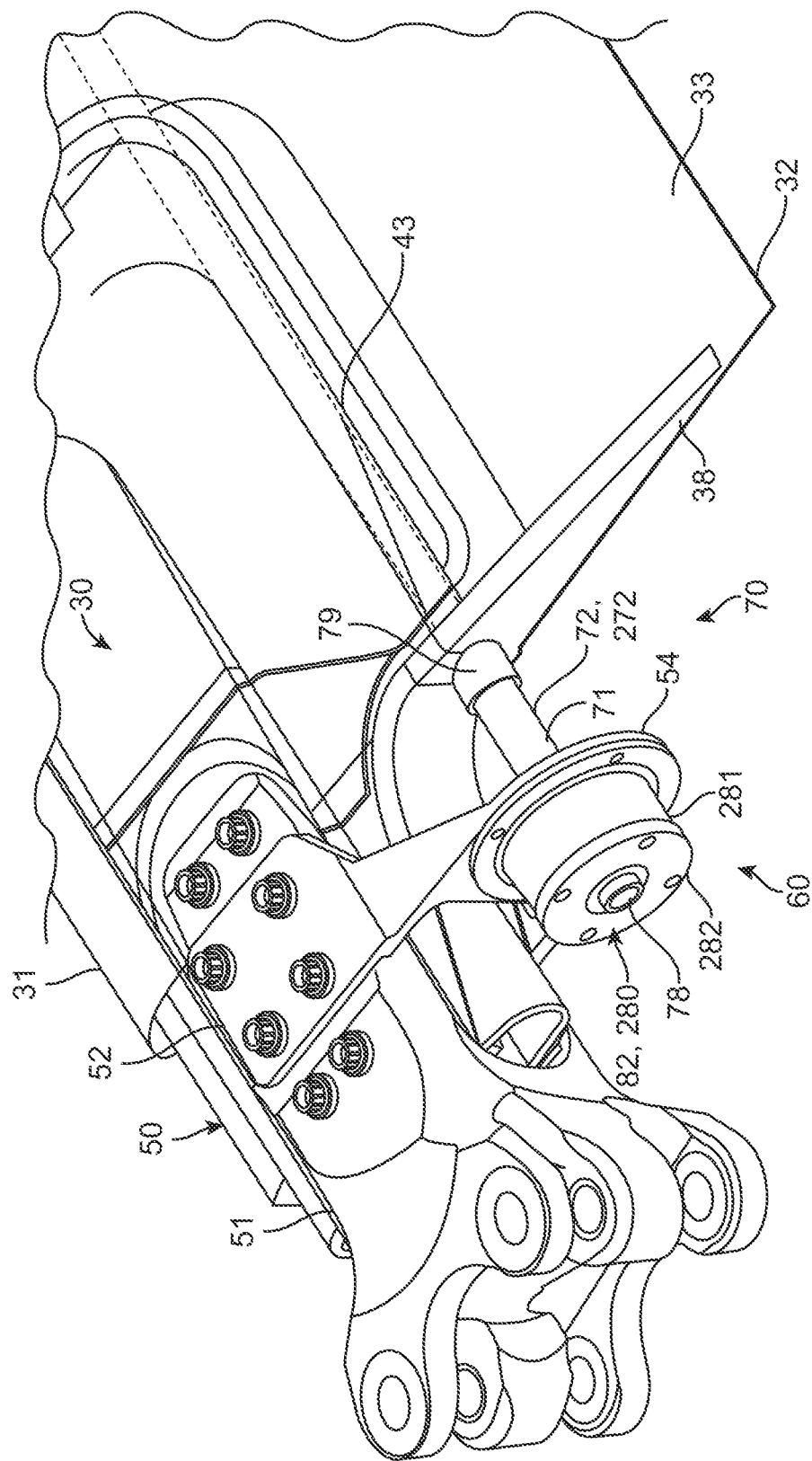
FIG. 9A is a perspective view of a rotor blade with a mounting bracket assembly and an electrical conductor system according to another embodiment that can be used with the aircraft of FIG. 1A.
Figure 9B:
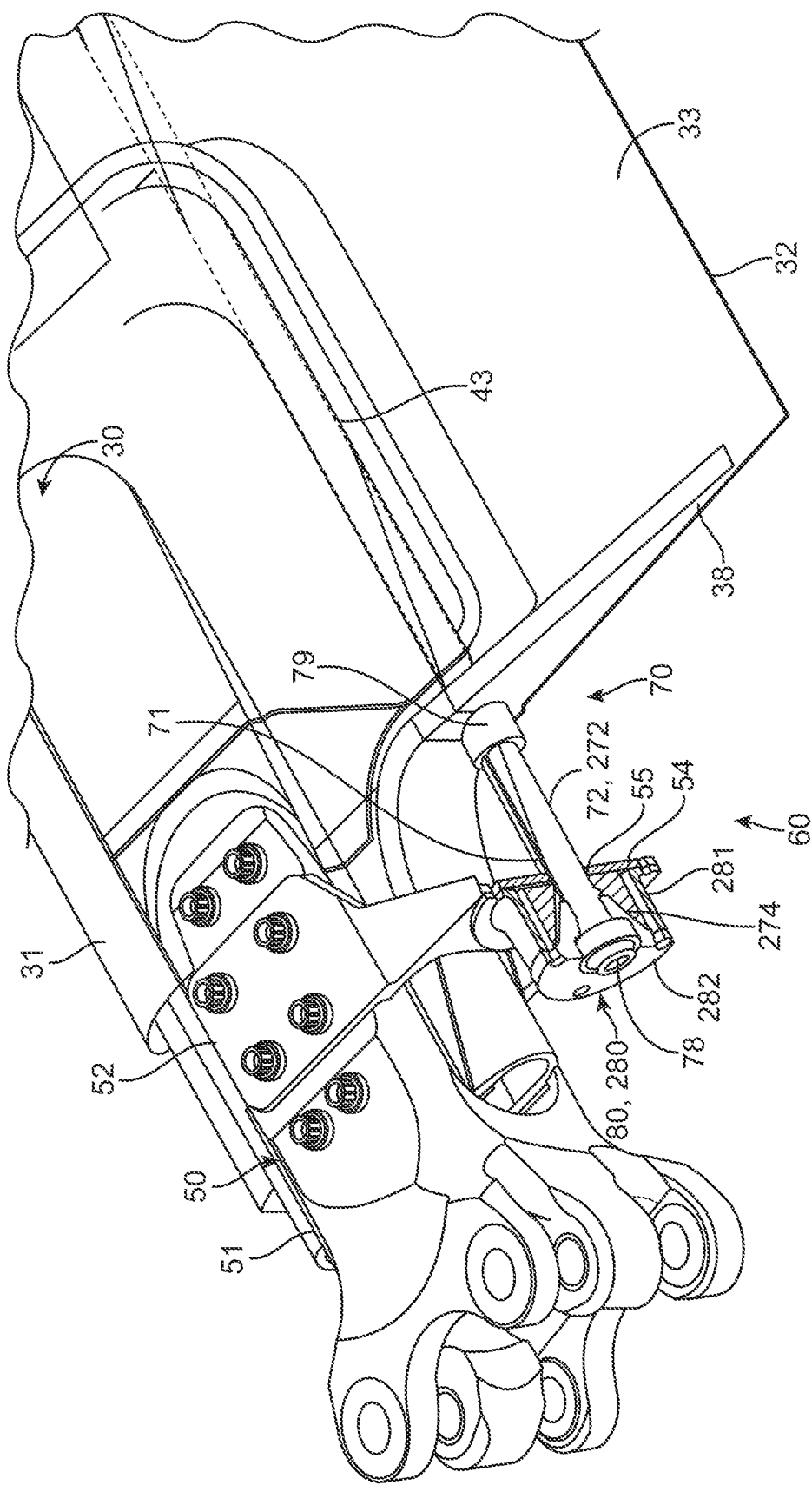
FIG. 9B is a cross-sectional view of FIG. 9A.
Figure 12:
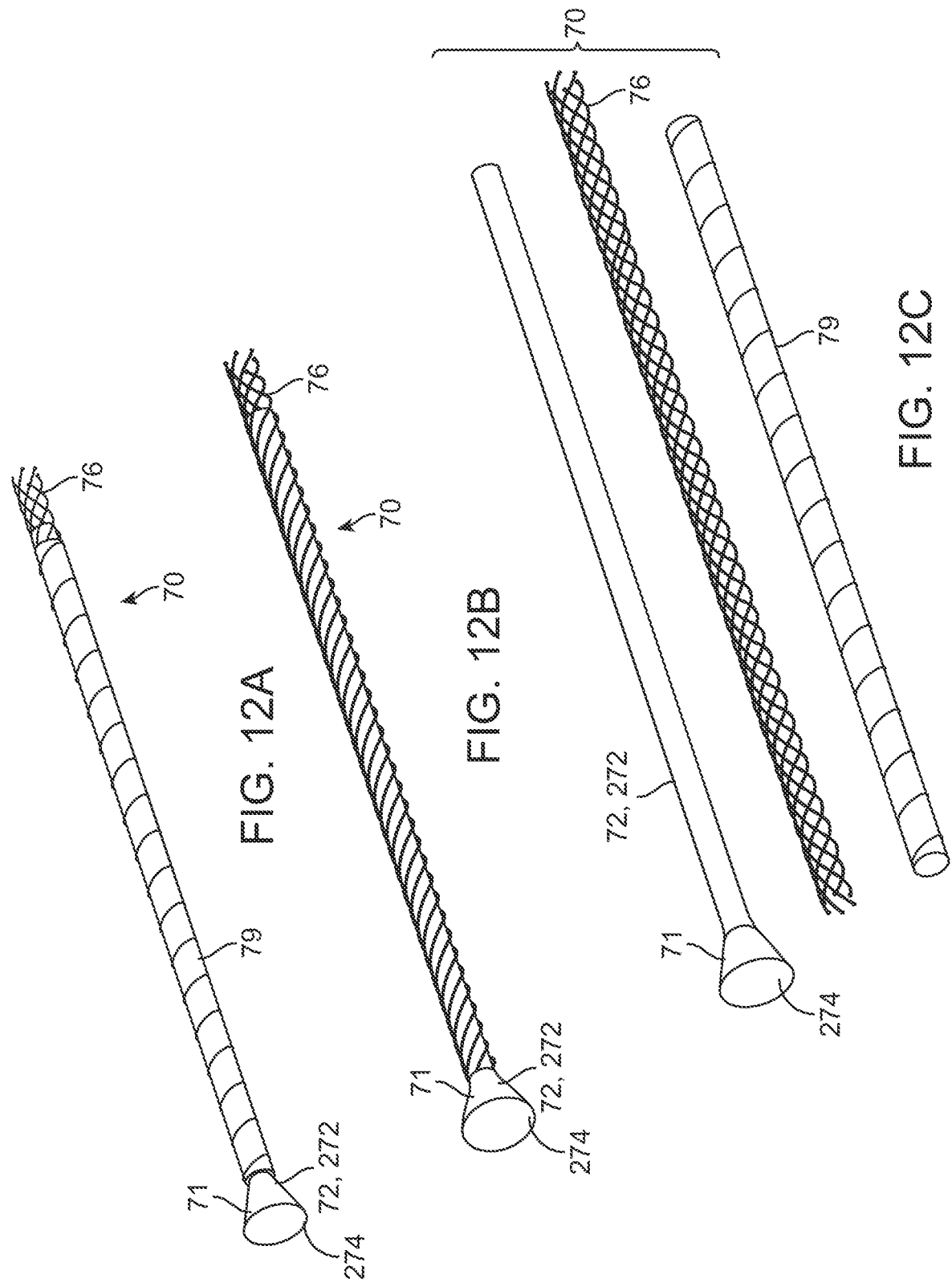
FIG. 12A is a perspective view of an electrical conductor assembly of the electrical conductor system of FIG. 9A.
FIG. 12B is a perspective view of a portion of the electrical conductor assembly of FIG. 12A.
FIG. 12C is an exploded view of the electrical conductor assembly of FIG. 12A.

The conical structural member 272 may have a hollow interior (as shown in FIG. 11) or may have a partially or completely filled interior (as shown in FIG. 9B). As shown in FIG. 10, the conical structural member 272 (and the rest of the electrical conductor assembly 70) may be positioned within the spar conic 44 or within the core 42, depending on the desired configuration.

As shown in FIGS. 9B and 11-12C, the inboard end portion 71 of the conical structural member 272 includes a cone (conical portion) 274 that is configured to attach to the second bracket 52 (as shown in FIGS. 9B and 11). Accordingly, the inboard end of the conical structural member 272 has a larger outer diameter than the body portion of the conical structural member 272 to secure the electrical conductor assembly 70 to the second bracket 52. The outer diameter of the cone 274 is larger than the inner diameter of the through-hole 55 of the extension 54 of the second bracket 52.

To attach the conical structural member 272 to the second bracket 52, the conical structural member 272 extends through and is positioned within a through-hole 55 within the extension 54 of the second bracket 52, as shown in FIGS. 9B and 11. The cone 274 is positioned along one side of the extension 54 of the second bracket 52 and the rest of the conical structural member 272 is positioned along the other side of the extension 54 of the second bracket 52. The conical structural member 272 is pulled or moved through the through-hole 55 such that the outside surface of the cone 274 abuts against the inner surface of the through-hole 55 (or the outer surface of the extension 54) and the conical structural member 272 cannot move any further through the through-hole 55.

The conical anchor assembly 280 is configured to secure the conical structural member 272 to the second bracket 52. Accordingly, the conical anchor assembly 280 includes a concave portion 281 and a convex portion 282 that are complementary to the outer surface of the cone 274 and to the inner surface of the cone 274, respectively. The concave portion 281 may optionally be a separate component from the second bracket 52 and attachable (e.g., fastenable) to the extension 54 (as shown in FIGS. 9A-9B) or may be an integral component with extension 54 of the second bracket 52 (as shown in FIG. 11). The convex portion 282 is attachable or fastenable to an end of the concave portion 281 once the conical anchor assembly 280 is assembled.

The concave portion 281 defines a through-hole such that the body of the conical structural member 272 can extend through the concave portion 281. The convex portion 282 also may define a through-hole to allow access into an inner area of the conical structural member 272. The inboard electrical connector 78 (as well as an inner portion of the conical structural member 272) may optionally be positioned at least partially within the through-hole of the convex portion 282, as shown in FIG. 9B.

As shown in FIGS. 9B and 11, the cone 274 is positioned at least partially within the concave portion 281 such that the outer surface of the cone 274 abuts the inner surface of the concave portion 281. The convex portion 282 is positioned at least partially within the cone 274 such that the outer surface of the convex portion 282 abuts the inner surface of the cone 274. Accordingly, the cone 274 is sandwiched between and secured in place by the concave portion 281 and the convex portion 282, thereby securing the inboard end portion 71 of the conical structural member 272 relative to the second bracket 52. Optionally, the cone 274 may be bonded to the concave portion 281 and/or to the convex portion 282.

According to one embodiment as shown in FIGS. 10 and 12A-12C, the electrical conductors 76 may be positioned and wrapped around an outer surface of the conical structural member 272, and the overwrap 79 (as described further herein) may be positioned and wrapped around the outer surface of the electrical conductors 76. However, according to various other embodiments, the electrical conductors 76 may be positioned within an interior area of the conical structural member 272 (and the electrical connector 78 may thus be positioned within (or aligned with the end of) the cone 274).

Spiral Structural Member

According to one embodiment as shown in FIGS. 13-15B, the structural member 72 is a spiral structural member 372. The spiral structural member 372 may have all of the features, aspects, and components of the looped structural member 172 and the conical structural member 272, unless otherwise noted in the description herein.

Figure 13:
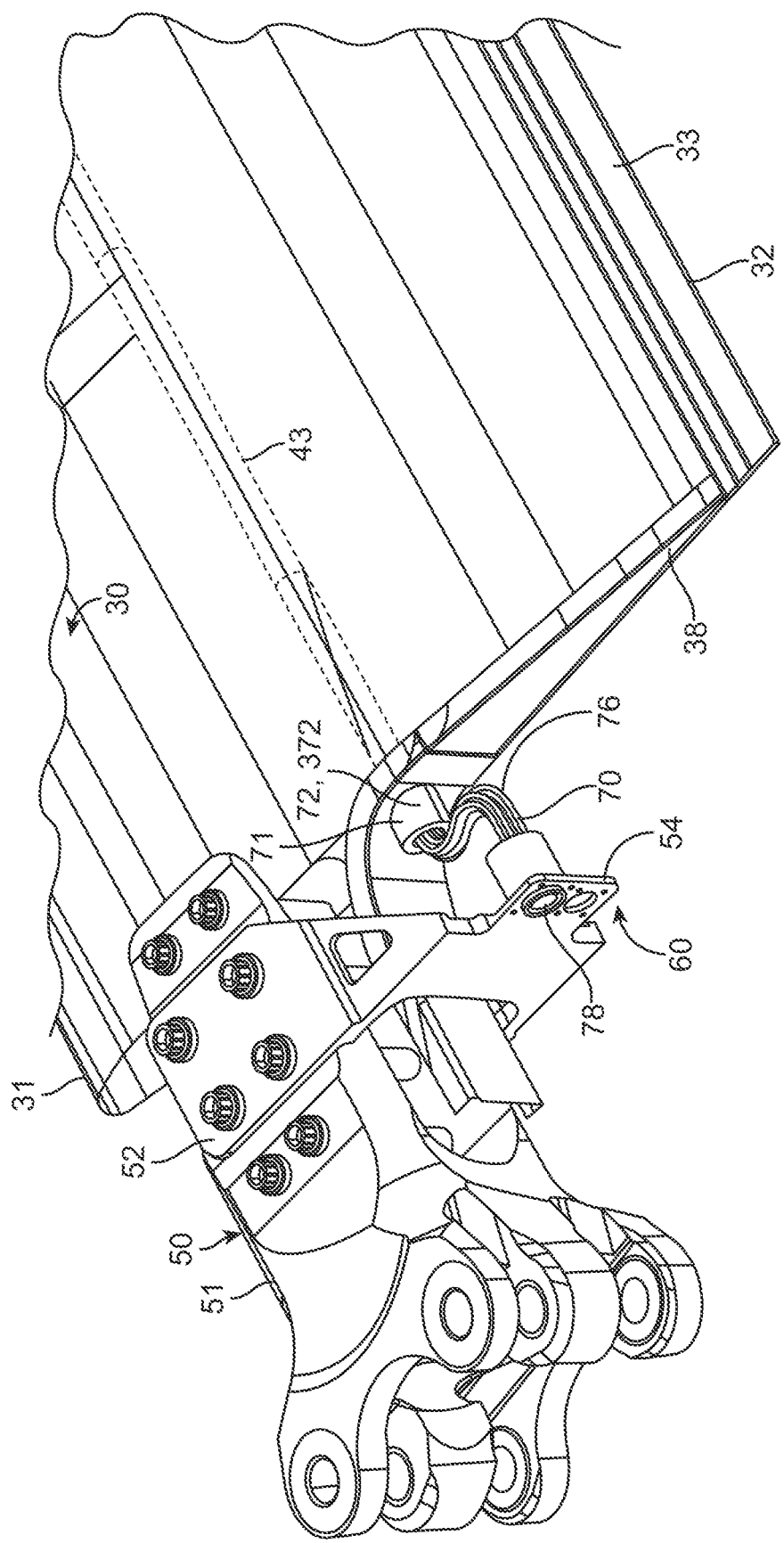
FIG. 13 is a perspective view of a rotor blade with a mounting bracket assembly and an electrical conductor system according to another embodiment that can be used with the aircraft of FIG. 1A.

The inboard end portion 71 of the spiral structural member 372 may be attached and secured relative to the rotor blade 30 with the various anchor assemblies 80 described herein. Alternatively, the inboard end portion 71 of the spiral structural member 372 may secured directly to the inboard end 38 of the rotor blade 30, while the electrical conductors 76 may be movably attached to the second bracket 52 via the electrical connector 78, as shown in FIG. 13.

Figure 14:
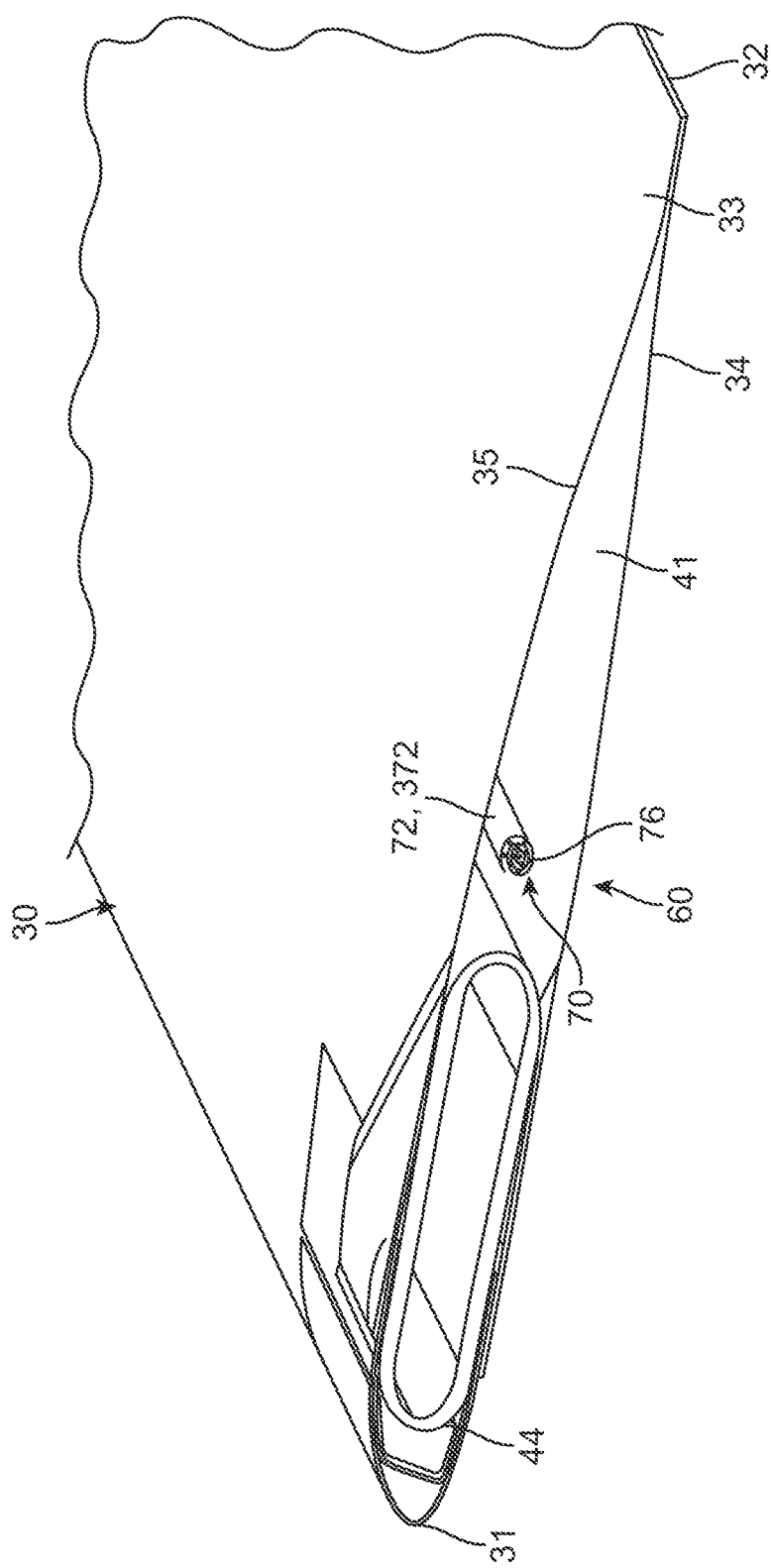
FIG. 14 is a cross-sectional view of FIG. 13.

According to one embodiment as shown in FIG. 14, the spiral structural member 372 is positioned within the inner area 41 of the rotor blade 30, outside of the spar conic 44. The core 42 is omitted in FIG. 14 for clarity.

Figure 15A:
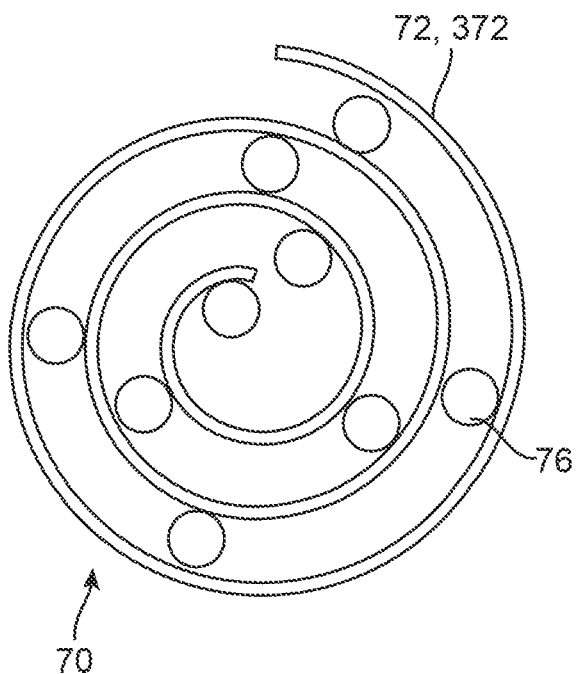
FIG. 15A is a cross-sectional view of a portion of an electrical conductor assembly of the electrical conductor system of FIG. 13.

FIG. 15A shows a cross-sectional view of the spiral structural member 372 with the electrical conductors 76. The spiral structural member 372 includes a sheet that has been rolled into a spiral (such that a first portion of the sheet is concentric with a second portion of the sheet), with at least part of the electrical conductors 76 positioned within the spiral, between the various layers of the spiral (and between the first and second portions of the sheet).

Figure 15B:
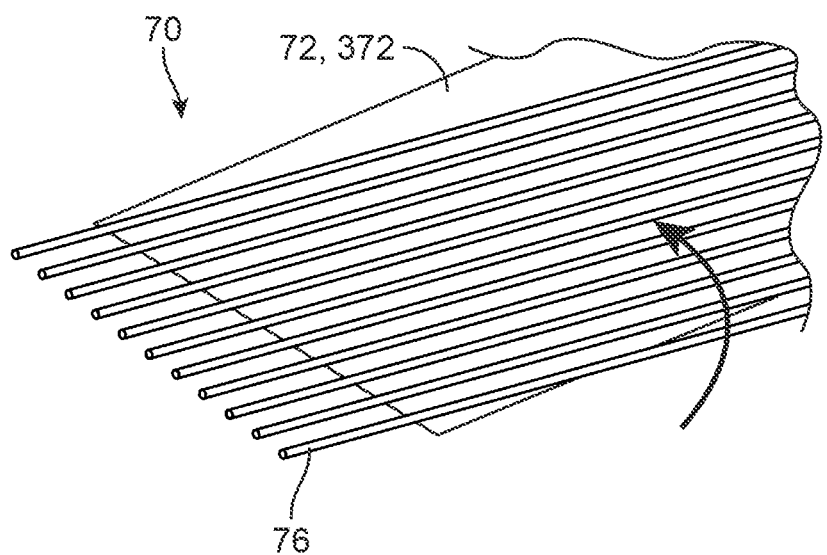
FIG. 15B is cross-sectional view of a portion of the electrical conductor assembly of FIG. 15A in an unassembled position.

FIG. 15B shows the spiral structural member 372 prior to being fully assembled. Prior to assembly, the spiral structural member 372 includes a substantially flat sheet, and the electrical conductors 76 are positioned along one side of the spiral structural member 372 (and may be spaced apart from each other). The spiral structural member 372 is then rolled or wrapped up (with the electrical conductors 76) into a spiral form (as shown in FIG. 15A). The spiral structural member 372 and the electrical conductors 76 are then bonded and cured together.

Manufacturing Method for the Electrical Conductor Assembly

FIGS. 16A-21 show a method of manufacturing the electrical conductor assembly 70, which includes treating the various electrical and structural components of the electrical conductor assembly 70 prior to assembly, supporting the electrical and structural components of the electrical conductor assembly 70 prior to and during assembly, and assembling the electrical and structural components of the electrical conductor assembly 70.

Figure 17:
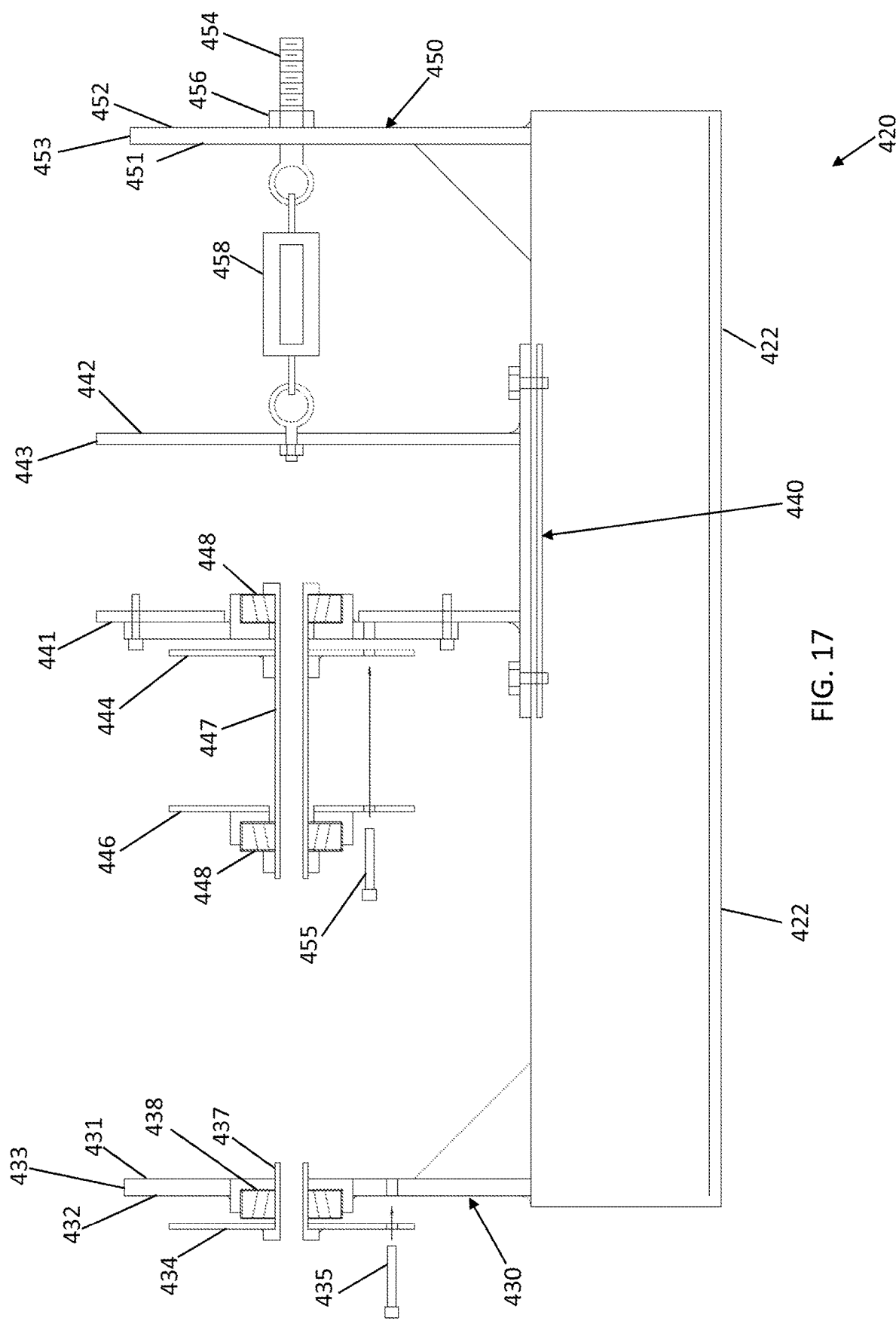
FIG. 17 is a cross-sectional view of a cable assembly machine according to another embodiment.

FIGS. 16A-17 show a cable assembly machine 420 that is configured to manufacture and assemble the electrical conductor assembly 70. The cable assembly machine 420 comprises a platform 422, a base 430, a slidable trolley 440, and a tensioner 450. The platform 422 is configured to support the base 430, the slidable trolley 440, and the tensioner 450. The base 430 and the tensioner 450 are statically attached or fixed to and extend upwardly from the platform 422. The base 430 is positioned along a first end portion of the platform 422, and the tensioner 450 is positioned along a second end portion of the platform 422 (that is opposite the first end portion).

The fixed base 430 includes a base wall 433 with an inner side 431 and an outer side 432 that are opposite each other. The inner side 431 faces inwardly toward the slidable trolley 440, and the outer side 432 faces outwardly, away from the slidable trolley 440. The base 430 includes a base fixable positioner 434 (e.g., a base indexing disc) that is statically fixable to the base wall 433, a base rotatable positioner 436 (e.g., a base accessory disc) that is rotatably attached to the base wall 433, and a hollow through base shaft 437 (e.g., a fixed end axle) that is positioned at least partially within the base fixable positioner 434 and the base rotatable positioner 436. The base fixable positioner 434 and the base rotatable positioner 436 share a common axis. As shown in FIG. 17, the base fixable positioner 434 (and optionally also the base rotatable positioner 436) each define a through-hole that is configured to receive the base shaft 437 to receive a portion of the structural member 72. The base fixable positioner 434 and the base rotatable positioner 436 are rotatable relative to the base shaft 437.

According to one embodiment as shown in FIG. 17, the base 430 may optionally include a locking pin 435 that is configured to lock the base fixable positioner 434 in a certain rotational position relative to the base wall 433, if desired. Accordingly, the base fixable positioner 434 and the base wall 433 each define at least one through-hole that are each configured to receive the locking pin 435 such that the locking pin 435 can extend through each of the two through-holes to lock the base fixable positioner 434 in place relative to the base wall 433.

According to one embodiment as shown in FIG. 16A, the base fixable positioner 434 and the base rotatable positioner 436 are positioned along the inner side 431 of the base wall 433. The base fixable positioner 434 is positioned closer to the inner side 431 of the base wall 433 (and further from the slidable trolley 440), and the base rotatable positioner 436 is positioned further from the inner side 431 of the base wall 433 (and closer to the slidable trolley 440). According to another embodiment as shown in FIG. 17, the base fixable positioner 434 is positioned along the outer side 432 of the base wall 433, and the base 430 does not include the base rotatable positioner 436.

The tensioner 450 includes a tensioner wall 453 with an inner side 451 and an outer side 452 that are opposite each other. The inner side 451 faces inwardly toward the slidable trolley 440, and the outer side 452 faces outwardly, away from the slidable trolley 440. The tensioner 450 includes a load cell or preload scale 458 that is positioned between, extends between, and connects the inner side 451 of the tensioner wall 453 and the second side 442 of the trolley wall 443.

The tensioner 450 includes a tensioning rod or bolt 454 and a tensioning nut 456 that are configured to tension the preload scale 458 and thus the slidable trolley 440. As shown in FIG. 17, the tensioning bolt 454 extends through a hole defined by the tensioner wall 453 and extends between the inner side 451 and the outer side 452 of the tensioner wall 453. The threads of the tensioning bolt 454 are positioned along the outer side 452, and the head of the tensioning bolt 454 (which may include a loop) is positioned along the inner side 451 and is attached to a first side of the preload scale 458. A second side of the preload scale 458 (that is opposite the first side of the preload scale 458) is attached to the second side 442 of the trolley wall 443. The tensioning nut 456 is positioned along the outer side 452 of the tensioner wall 453, along the threads of the tensioning bolt 454. By moving the tensioning nut 456 along the length of the tensioning bolt 454 (e.g., by screwing or unscrewing the tensioning nut 456), the position of the tensioning bolt 454 is changed relative to the tensioner wall 453, which moves the first side of the preload scale 458 either closer to or further from the inner side 451 of the tensioner wall 453. Since the second side of the preload scale 458 is attached to the second side 442 of the slidable trolley, moving the position of the tensioning nut 456 changes the tension on the preload scale 458 when the slidable trolley 440 has been secured in place.

The slidable trolley 440 is slidably attached to the platform 422 and is positioned between the inner side 431 of the base 430 and the inner side 451 of the tensioner 450 along the length of the platform 422. The slidable trolley 440 is movable along the length of the platform 422 between the base 430 and the tensioner 450. Accordingly, the slidable trolley 440 may define slots that connect to the platform 422 to allow the slidable trolley 440 to have a particular amount of travel relative to the platform 422. The slidable trolley 440 may be locked in place once the structural member 72 is tensioned or may be movable throughout the manufacturing process, using the preload scale 458 to maintain the proper position of the slidable trolley 440 (and thus the proper tension on the structural member 72).

The slidable trolley 440 includes a circumferential trolley wall 443 with an outer surface that includes a first side 441 and a second side 442 that are opposite each other. Alternatively, instead of the circumferential trolley wall 443, the slidable trolley 440 may include two walls that extend substantially parallel to each other and define the first side 441 and the second side 442. The first side 441 faces toward the base 430, and the second side 442 faces toward the tensioner 450. The inner side 431 of the base 430 faces toward the first side 441 of the trolley wall 443, and the inner side 451 of the tensioner 450 faces toward the second side 442 of the trolley wall 443.

The slidable trolley 440 includes a trolley fixable positioner 444 (e.g., a trolley indexing disc) that is statically fixable to the slidable trolley 440, a trolley rotatable positioner 446 (e.g., a trolley accessory disc) that is rotatably attached to the slidable trolley 440, and a hollow through trolley shaft 447 that is positioned at least partially within the trolley fixable positioner 444 and the trolley rotatable positioner 446. The trolley fixable positioner 444 and the trolley rotatable positioner 446 are positioned along the first side 441 of the trolley wall 443 and share a common axis. The trolley fixable positioner 444 is positioned closer to the first side 441 of the trolley wall 443 (and further from the base 430), and the trolley rotatable positioner 446 is positioned further from the first side 441 of the trolley wall 443 (and closer to the base 430). As shown in FIG. 17, the trolley fixable positioner 444 and the trolley rotatable positioner 446 each define a through-hole that is configured to receive the trolley shaft 447 to receive a portion of the structural member 72. The trolley fixable positioner 444 and the trolley rotatable positioner 446 are rotatable relative to the trolley shaft 447.

As shown in FIG. 17, the slidable trolley 440 may include a locking pin 455 that is configured to lock the trolley fixable positioner 444 and/or the trolley rotatable positioner 446 in a certain rotational position relative to the trolley wall 443. Accordingly, the trolley fixable positioner 444, the trolley rotatable positioner 446, and the trolley wall 443 each define at least one through-hole that are each configured to receive the locking pin 455 such that the locking pin 455 can extend through each of the three through-holes to lock the trolley fixable positioner 444 and the trolley rotatable positioner 446 in place relative to the trolley wall 443.

Both the trolley fixable positioner 444 and the trolley rotatable positioner 446 can be rotatable and fixed, depending on whether the locking pin 455 is inserted. The trolley fixable positioner 444 and the trolley rotatable positioner 446 may optionally be rotatable together to keep the electrical conductors 76 in tension during use and to wind the electrical conductors 76 around the structural member 72.

As shown in FIG. 21, the slidable trolley 440 may include elastic tensioning cords 449 that are attached to and connect the trolley fixable positioner 444 and the trolley rotatable positioner 446. The tensioning cords 449 keep the electrical conductors 76 in tension during manufacturing.

As shown in FIG. 17, the slidable trolley 440 may further include angular contact ball bearings 448 for each of the trolley fixable positioner 444 and the trolley rotatable positioner 446. Similarly, the base 430 may further include an angular contact ball bearing 438 for the base fixable positioner 434.

As shown in FIG. 16A, the structural member 72 extends between and connects the inner side 431 of the base wall 433 and the first side 441 of the trolley wall 443. In particular, a first end of the structural member 72 is attached to and extends through the base fixable positioner 434 (and optionally also the base rotatable positioner 436). A second end of the structural member 72 (that is opposite the first end of the structural member 72) is attached to and extends through the trolley fixable positioner 444 and the trolley rotatable positioner 446. The base fixable positioner 434, the base rotatable positioner 436, the trolley fixable positioner 444, and the trolley rotatable positioner 446 may all be axially aligned (along the same axis) with each other such that the structural member 72 extends in a straight line between them.

FIG. 18 shows the various components of the electrical conductor assembly 70 being assembled together into the final electrical conductor assembly. First, the looped structural member 172 is provided. An overcoat of sealant 74 (e.g., an adhesive or A/C 730 B2 sealant) is then applied around an outer surface of the looped structural member 172, leaving the two ends of the looped structural member 172 free. The plurality of electrical conductors 76 (e.g., 11 wires) are helically wrapped around the outside of the sealant 74, and another overcoat of sealant 74 is applied around an outer surface of the electrical conductors 76. The overwrap 79 (e.g., 2 inch by 0.020 inch of self-fusing tape) is wrapped tightly over the sealant 74 (and thus over the electrical conductors 76). Bumpers 75 may optionally be positioned at various portions (e.g., 2-3 feet intervals) along the outside of the overwrap 79 and may be attached via a fastener, such as tape. The electrical conductor assembly 70 may be cut to its final length (e.g., approximately 18 feet), leaving sufficient length of the electrical conductors 76 at the both ends to connect to the electrical connector 78 and to the electrical device 64 (as shown previously).

Figure 19:
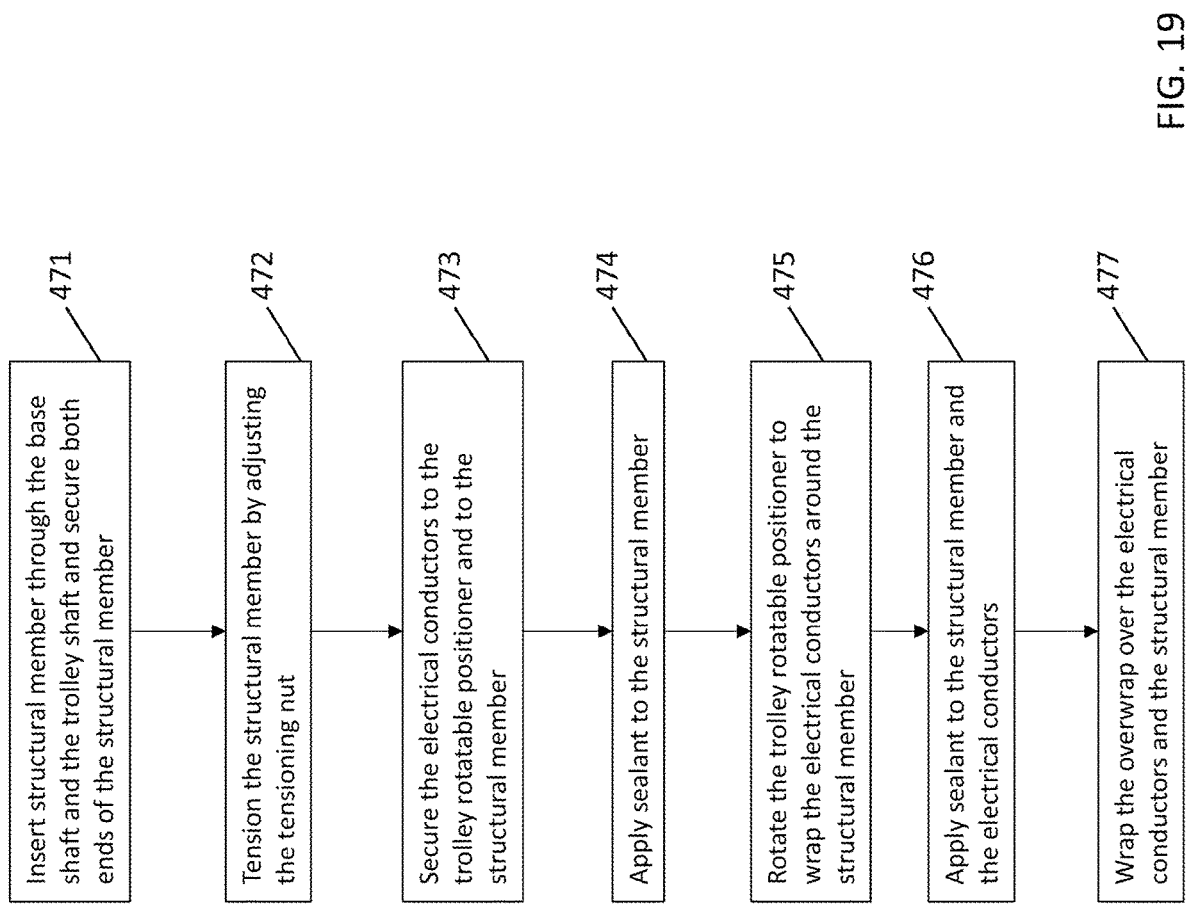
FIG. 19 is a flow diagram of a method of manufacturing an electrical conductor assembly according to one embodiment.

FIG. 19 shows the method of manufacturing the electrical conductor assembly 70 and FIGS. 20A-21 show various embodiments of the cable assembly machine 420 manufacturing the electrical conductor assembly 70. The configuration of the cable assembly machine 420 allows the structural member 72 to be independently tensioned as the electrical conductors 76 are helically wound around the structural member 72. Furthermore, the cable assembly machine 420 is scalable to accommodate any desired length of the electrical conductor assembly 70.

As shown in FIG. 19, in step 471, the structural member 72 is attached to the cable assembly machine 420 by inserting the structural member 72 into and through the base shaft 437 and the trolley shaft 447 (through the respective center axles of the base fixable positioner 434, the trolley fixable positioner 444, and the trolley rotatable positioner 446 (and optionally the base rotatable positioner 436, if included). Both ends of the structural member 72 are secured or locked into place (optionally with locking pins). The end of the structural member 72 that is fixed to the base 430 is fixed into a stationary position (since the position of the base 430 is fixed relative to the platform 422), and the end of the structural member 72 that is fixed or attached to the slidable trolley 440 is movable relative to the platform 422 such that the structural member 72 can be tensioned. However, the trolley rotatable positioner 446 (and the trolley fixable positioner 444) may be rotatable relative to the structural member 72. As shown in FIGS. 20A and 21, the structural member 72 extends and is secured between the base 430 and the slidable trolley 440.

In step 472, the structural member 72 is tensioned and preloaded between the slidable trolley 440 and the base 430 by adjusting the tensioning nut 456, which applies tension via the tensioning bolt 454 and the preload scale 458. In particular, the tensioning nut 456 is rotated relative to the tensioning bolt 454, which moves the tensioning nut 456 along the length of the tensioning bolt 454 in a direction toward the slidable trolley 440 (until the desired pretension is achieved). This moves the tensioning bolt 454 and pulls the preload scale 458 in a direction away from the slidable trolley 440. The preload scale 458 (which is attached to the second side 442 of the slidable trolley 440) pulls the slidable trolley 440 in a direction toward the tensioner 450 (and thus away from the base 430), which applies tension to the structural member 72 (since the structural member 72 is secured to the slidable trolley 440 and the base 430). The base fixable positioner 434 can subsequently be locked into place.

In step 473, the electrical conductors 76 are attached to the cable assembly machine 420. In particular, one end of each of the electrical conductors 76 is secured to the trolley rotatable positioner 446 such that the electrical conductors 76 are evenly spaced apart from each other about the circumference of the trolley rotatable positioner 446 into an array of electrical conductors 76. This configuration ensures a uniform helical lay of the electrical conductors 76 onto the structural member 72. The electrical conductors 76 are routed (with the structural member 72) through the base shaft 437 and thus through the center of the axle of the base fixable positioner 434. The other end of each of the electrical conductors 76 is secured to the structural member 72 at or near the connection between the structural member 72 and the base 430 and may also be secured to the base 430 to prevent the electrical conductors 76 from rotating and maintain the orientation of the electrical conductors 76.

In step 474, sealant 74 is applied to the outside of the structural member 72 (and optionally also to the electrical conductors 76), starting from the base 430 and moving in a direction toward the slidable trolley 440. In step 475, the trolley rotatable positioner 446 is rotated (relative to the base 430 and to the structural member 72), which coils or wraps the electrical conductors 76 around and over the structural member 72. The trolley rotatable positioner 446 is rotated until the desired helical lay (or turns per foot) is achieved along the portion of the structural member 72 with the sealant 74. The electrical conductors 76 are wrapped around the structural member 72 independent of the tension on the structural member 72.

The sealant 74 is spread out uniformly over the structural member 72 and the electrical conductors 76. The sealant 74 may optionally be applied at the same time as, before, and/or after step 475. Steps 474 and 475 may be continued incrementally in a direction from the base 430 toward the slidable trolley 440 until the electrical conductors 76 have been attached along the desired length of the structural member 72.

In step 476, once the helical layup of the electrical conductors 76 over the structural member 72 is completed, sealant 74 is applied uniformly again, over and to the structural member 72 and the electrical conductors 76, starting from the base 430 and moving in a direction toward the slidable trolley 440. This flexible adhesive application technique ensures that structural member 72 and the electrical conductors 76 are completely bonded together. In step 477, the overwrap 79 is wrapped around, wound over, or overcoated around the electrical conductors 76 and the structural member 72. This overwrap application technique ensures that the structural member 72 and the electrical conductors 76 are securely held together.

Once the electrical conductor assembly 70 has been assembled, the ends of the structural member 72 may be trimmed back to the desired length from the anchor assembly 80. The excess length of the electrical conductors 76 is also trimmed to the desired length and inserted into or attached to the electrical connector 78 along one end and to the electrical device 64 along the other end. By way of example, if the electrical conductor assembly 70 is approximately 20 feet long, there may be one to two feet of loose, untreated structural member 72 and electrical conductors 76 that is trimmed and fitted upon installation, although the length may vary in accordance with various embodiments.

Although each of the various aspects, features, components, and configurations are not separately described for each embodiment, each of the various embodiments disclosed herein may have any of the aspects, features, components, and configurations of the other embodiments, except where noted otherwise.

As utilized herein, the terms "approximately," "substantially," and similar terms are intended to have a broad meaning in harmony with the common and accepted usage by those of ordinary skill in the art to which the subject matter of this disclosure pertains. The terms "approximately" and "substantially" as used herein refers to ±10% of the referenced measurement, position, or dimension. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "attached," and the like as used herein mean the joining of two members directly to one another. Such joining may be stationary (e.g., permanent) or moveable (e.g., removable or releasable).

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, orientations, etc.) without materially departing from the novel teachings and advantages of the subject matter described herein. For example, the position of elements may be reversed or otherwise varied, and the nature or number of discrete elements or positions may be altered or varied. The order or sequence of any process or method steps may be varied according to alternative embodiments. Other substitutions, modifications, changes and omissions may also be made in the design, operating conditions and arrangement of the various exemplary embodiments without departing from the scope of the present invention.

What is claimed is:

1. An electrical conductor assembly for a rotor blade, the electrical conductor assembly comprising:
    a substrate comprising an inboard end portion and an outboard end portion; and
    at least one electrical conductor attached to the substrate and extending between the inboard end portion and the outboard end portion, the at least one electrical conductor configured to transmit electricity along a length of the rotor blade,
    the inboard end portion and the outboard end portion being structured such that when the electrical conductor assembly is installed within the rotor blade, the substrate is secured to the rotor blade only through the inboard end portion, and the outboard end portion is independently movable relative to the rotor blade and configured to provide structural support to and carry a weight of the at least one electrical conductor under centrifugal force created when the rotor blade is rotated;
    wherein the at least one electrical conductor extends beyond the outboard end portion of the substrate, the at least one electrical conductor configured to couple with an electrical device.

2. The electrical conductor assembly of claim 1, further comprising an overwrap wrapped around at least a portion of the at least one electrical conductor.

3. The electrical conductor assembly of claim 1, wherein the at least one electrical conductor is bonded to an outer surface of the substrate.

4. The electrical conductor assembly of claim 1, wherein the at least one electrical conductor is wrapped around an outer surface of the substrate.

5. The electrical conductor assembly of claim 1, wherein the inboard end portion is configured to be positioned outside of the rotor blade and the outboard end portion is configured to be positioned inside of the rotor blade.

6. The electrical conductor assembly of claim 1, wherein the substrate is configured to be attachable to, removable from, and reattachable to the rotor blade.

7. The electrical conductor assembly of claim 1, wherein the substrate is doubled over itself to form a loop at the inboard end portion, the loop being configured to be coupled to an anchor assembly coupled to the rotor blade.

8. The electrical conductor assembly of claim 1, wherein the inboard end portion comprises a conical portion that is configured to attach to a bracket.

9. The electrical conductor assembly of claim 1, wherein the substrate comprises a sheet rolled so as that a first portion of the sheet is concentric with a second portion of the sheet, wherein at least part of the at least one electrical conductor is positioned between the first and second portions.

10. An electrical conductor system comprising:
    the electrical conductor assembly of claim 1; and
    an anchor assembly comprising
        a clamshell assembly comprising a first clamshell portion and a second clamshell portion, wherein the first clamshell portion and the second clamshell portion are configured to enclose therebetween at least a portion of the inboard end portion;
        a pin extending through the first clamshell portion and the second clamshell portion, wherein the pin is configured to attach to a bracket such that the clamshell assembly is independently rotatable relative to the bracket.

11. An anchor assembly for an electrical conductor assembly for a rotor blade, the electrical conductor assembly comprising a substrate positionable partially within the rotor blade, the anchor comprising:
    a clamshell assembly comprising a first clamshell portion and a second clamshell portion, the first clamshell portion and the second clamshell portion being configured to together enclose at least a portion of an inboard end portion of the substrate; and
    a pin extending through the first clamshell portion and the second clamshell portion, the pin being configured to attach to a bracket such that the clamshell assembly is independently rotatable relative to the bracket.

12. The anchor assembly of claim 11, wherein the first clamshell portion defines a first groove and the second clamshell portion defines a second groove, wherein the first groove and the second groove are each configured to receive opposite sides of the inboard end portion.

13. The anchor assembly of claim 12, wherein the first groove and the second groove are each rounded along their length such that the first groove and the second groove are configured to receive a loop of the substrate along the inboard end portion.

14. The anchor assembly of claim 12, wherein the first clamshell portion defines a first hole and the second clamshell portion defines a second hole, wherein the first hole and the second hole are configured to receive the pin, wherein the first groove extends around the first hole along its length and the second groove extends around the second hole along its length.

15. The anchor assembly of claim 11, wherein the clamshell assembly is configured to removably and reattachably secure the inboard end portion of the substrate.

16. The anchor assembly of claim 11, further comprising the bracket, wherein the bracket is configured to statically attach to the rotor blade.

* * * * *